(12) United States Patent
Doi et al.

(10) Patent No.: US 6,839,869 B2
(45) Date of Patent: Jan. 4, 2005

(54) TRACE CONTROL CIRCUIT FOR TRACING CPU OPERATION IN REAL TIME

(75) Inventors: Yoshifumi Doi, Tokyo (JP); Teruaki Kanzaki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 486 days.

(21) Appl. No.: 09/850,112

(22) Filed: May 8, 2001

(65) Prior Publication Data

US 2002/0066053 A1 May 30, 2002

(30) Foreign Application Priority Data

Nov. 27, 2000 (JP) ........................................ 2000-359793

(51) Int. Cl.[7] .............................................. B06F 11/00
(52) U.S. Cl. ............................................ 714/45; 714/39
(58) Field of Search ............................. 714/45, 30, 47, 714/39; 712/227, 233

(56) References Cited

U.S. PATENT DOCUMENTS

| | | | | |
|---|---|---|---|---|
| 6,347,383 B1 | * | 2/2002 | Elnozahy | 714/53 |
| 6,615,370 B1 | * | 9/2003 | Edwards et al. | 714/45 |
| 6,633,973 B1 | * | 10/2003 | Kanzaki | 712/227 |
| 6,684,348 B1 | * | 1/2004 | Edwards et al. | 714/45 |
| 6,691,305 B1 | * | 2/2004 | Henkel et al. | 717/136 |
| 6,728,906 B1 | * | 4/2004 | Case et al. | 714/45 |
| 6,732,307 B1 | * | 5/2004 | Edwards | 714/724 |
| 6,732,311 B1 | * | 5/2004 | Fischer et al. | 714/737 |
| 6,769,076 B1 | * | 7/2004 | Moyer et al. | 714/30 |
| 2003/0051122 A1 | * | 3/2003 | Sato | 712/227 |

FOREIGN PATENT DOCUMENTS

| | | |
|---|---|---|
| JP | 02-148339 A | 6/1990 |
| JP | A 2-205937 | 8/1990 |
| JP | 02-244342 A | 9/1990 |

* cited by examiner

*Primary Examiner*—Scott Baderman
*Assistant Examiner*—Anne L. Damiano
(74) *Attorney, Agent, or Firm*—Burns, Doane, Swecker & Mathis, L.L.P.

(57) ABSTRACT

A trace control circuit includes a branch event generation circuit 1 having an address abbreviation information generation circuit 8 for detecting a portion in which a branch-source address and a branch-destination address are overlapped with each other from the upper-bit side of the address data thereof and generating branch-destination address abbreviation information on the basis of the result of the detection, and a trace data abbreviation circuit 5 for performing abbreviation of one part of trace data in accordance with the branch-destination address abbreviation information and outputting the partly abbreviated trace data, whereby the number of data packets of the trace data can be reduced to speed up the output operation of the trace data, and the ability to output trace data in real time can be thereby improved greatly.

8 Claims, 16 Drawing Sheets

TRACE CONTROL CIRCUIT FOR TRACING CPU OPERATION IN REAL TIME

BACKGROUND OF THE INVENTION

1. Field of the Invention

The present invention relates to a trace control circuit for outputting trace information for use in effectuating a high-efficiency program debugging operation, and more particularly relates to a trace control circuit which is preinstalled in a microcomputer and capable of outputting real-time trace information regarding the operation of a CPU.

2. Description of the Related Art

Conventionally, program debugging operations concerning microcomputers have normally been performed by use of an In-Circuit Emulator (hereinafter referred to just as an "ICE emulator"). An ICE emulator has a function of emulating a program debugging operation concerning the microcomputer. In order to realize the emulation by use of an ICE emulator, conventionally address busses and data busses in a microcomputer are first connected to a memory means on an ICE emulator, and a program is downloaded from a host computer controlling the ICE emulator to the memory means of the ICE emulator so as to operate the microcomputer. Thereafter, the program debugging operation is executed regarding a connection terminal on the ICE emulator as being an external terminal of the microcomputer provided in a program-debugging target system.

Normally, in an LSI in which a microcomputer is preinstalled, programs are stored in a memory device preinstalled in the microcomputer, so that the address busses and data busses regarding the CPU of the microcomputer are not connected to the external terminal of the LSI. For this reason, the address busses and data busses have to be drawn to the LSI external terminal by providing an ICE connection exclusive mode, and in this ICE connection exclusive mode, the process concerning the essential function of the LSI external terminal used as a connection terminal for these address busses and data busses is emulated within the ICE.

However, as the connection between the LSI as the target system and the ICE requires the same number of connection terminals as that of the microcomputer, it has become more difficult in recent years to make a connection between the ICE and the target system, due to the fact that the operation speed of the computers are generally made faster, the number of data busses is increased and so on. Further, since a system LSI containing therein a microcomputer is provided with various function elements for realizing various functions of the system in addition to this microcomputer, it has been made more difficult to emulate the essential function of the LSI external terminal used as a connection terminal for these address busses and data busses in the ICE connection exclusive mode.

Due to various factors as mentioned above, it has become more popular nowadays to employ a program developing method for debugging programs, in which a debugging circuit is installed in a microcomputer to replace the function of an ICE emulator, and connected to an external debugger located at the host computer side by way of an LSI terminal exclusively used for debugging operation. FIG. 14 is a block diagram showing the configuration of a microcomputer equipped with a conventional debugging circuit. In this figure, numeral 101 denotes a microcomputer equipped with a conventional debugging circuit, 102 denotes a CPU, 103 denotes a memory, 104 denotes a control bus, 105 denotes an address bus, 106 denotes a data bus, 107 denotes a bus interface, 108 denotes a control bus, 109 denotes an address bus, 110 denotes a data bus, 111 denotes a debugging circuit, 112 denotes a comparator, 113 denotes a download control circuit, 114 denotes a register control circuit, 115 denotes a trace control circuit, 116 denotes a register circuit. Further, numerals 117, 118, 119, 120, 121, 122, 123, and 124 all denote signal lines, reference character "DATA" denotes a multi-bit data signal terminal for inputting and outputting data to and from the external debugger, "CLK" denotes a clock signal terminal through which clock signals for tracing are transmitted for synchronizing with the trace data, "OE" denotes a control signal terminal through which a control signal for controlling input and output of data signals and clock signals, and character "SYNC" denotes a synchronous signal terminal through which a synchronous signal for tracing is transmitted. Input and output of data to and from the debugging circuit can be performed by use of these data signal terminal "DATA", the clock signal terminal "CLK", the control signal terminal "OE" and the data signal terminal "SYNC".

Next, the operation of the above-explained microcomputer equipped with a conventional debugging circuit is now explained below.

First, when a program is formed in the host computer, the host computer executes input and output of data to and from the debugging circuit 111 by use of the externally connected debugger through the data signal terminal "DATA", the clock signal terminal "CLK" and the control signal terminal "OE".

The data input to the debugging circuit 111 is decoded at the register control circuit 114, and thereafter reading of data from or outputting of data to each of the comparator 112, the download control circuit 113, the trace control circuit 115 and the register circuit 116 (registers 0 to 3) are performed by way of the signal lines 118, 119 and 120.

Next, by use of an external debugger, the program data formed by the host computer is input to the debugging circuit 111 through the clock signal terminal "CLK", the data signal terminal "DATA", and the control signal terminal "OE". The download control circuit 113 downloads the input program data to the preinstalled memory 103 of the microcomputer 101 through the control bus 104, the address bus 105, and the data bus 106.

Thereafter, the trace control circuit 115 takes in the data transmitted by way of the control bus 108, the address bus 109 and the data bus 110, and outputs trace information regarding the operating state of the CPU 102, by way of the clock signal terminal "CLK", the data signal terminal "DATA" and the synchronous signal terminal "SYNC".

Further, the host computer preliminarily writes a predetermined program execution address and a predetermined data into the comparator 112 by way of the clock signal terminal "CLK", the data signal terminal "DATA" and the control signal terminal "OE". The comparator 112 monitors the operational state of the CPU, and in a case where the signal data transmitted through the control bus 108, the address bus 109 and the data bus 110 coincides with the previously stored predetermined program execution address and the predetermined data, it outputs an interrupt request signal to the CPU 10 by way of the signal line 117. In this case, the CPU 102 executes an interrupt processing program preliminarily downloaded into the memory 103, and performs data communications regarding the interrupt processing between the CPU 102 and the external debugger by way of the register circuit 116.

By performing the above-explained operations concerning the microcomputer 101, the program debugging based on such procedures as shown below are made possible:

1) Make a debugging program by the host computer,

2) Download the program data into the memory preinstalled in the microcomputer

3) Execute the debugging program, triggered by an instruction of the host computer, and grasp the operational state of the microcomputer on the basis of the trace data output from the debugging circuit, and 4) Generate an interrupt request signal when a program address or the like previously set by the host computer appears, and perform data communications between the host computer and the debugging circuit regarding the interrupt processing by way of the external debugger, so as to grasp the operational state of the microcomputer as a whole.

However, in recent system LSIs, a microcomputer installed therein has been made to operate of higher speed, and thus the instruction execution frequency per predetermined time is also made higher, whereby it is made more difficult that the microcomputer extracts trace information from a limited number of connection terminals. FIG. 15 is a block diagram showing the inner construction of the trace control circuit 115 shown in FIG. 14, focussing on the circuit portion related to a generation of branch events. In the trace control circuit of this example, the length of address data is 16 bits, and the length of data to be processed is also 16 bits. In FIG. 15, numeral 131 denotes a branch event generation circuit, 132 denotes a CPU-access event generation circuit, 133 denotes a selector, 134 denotes a trace memory, 135 denotes a trace data output circuit, 136 denotes an OR gate, 137 denotes a status information generation circuit, 138 denotes an address data latch circuit for latching 16-bit data, 139 denotes an AND gate, 140 denotes an address data latch circuit for latching 16-bit data, 141 denotes an AND gate, 142 denotes a buffer, and 143 denotes an AND gate.

Next, the operation of the above-mentioned trace control circuit is explained.

FIG. 16 is a timing chart showing the waveshapes of various signals related to the trace control circuit. In FIG. 16, reference characters P1 and P2 denote base clock signals of the CPU, OPC denotes an ope-code fetch signal, OPCBUS denotes an output data to the ope-code bus, OPR denotes an operand fetch signal, OPRBUS denotes an output data to the operand bus, SYNC_CPU denotes a synchronous signal, RCLR denotes a branch-destination signal, ADCPU denotes an output data to the address bus, BRAS_CLK denotes a branch-source address latch signal, BRAD_CLK denotes a branch-destination address latch signal, SELL denotes a selection signal, TRW1 denotes a write signal to the trace memory 134, CLK denotes a clock signal for tracing, SYNC denotes a synchronous signal for tracing, and DATA denotes a trace data output from the data signal terminal.

As shown in FIG. 16, when the branch-source address latching signal BRAS_CLK which is provided from the AND gate 139 as an ANDed value of the synchronous signal SYNC_CPU and the base clock signal P1 becomes H level, the branch-source address data output to the address bus ADCPU of the CPU is latched by the latch circuit 138. Thereafter, when the branch-destination address latch signal BRAS_CLK, which is provided from the AND gate 141 as an ANDed value of the branch-destination signal RCLR and the base clock signal P1, becomes H level, the branch-destination address data output to the address bus ADCPU of the CPU is latched by the latch circuit 140. Then, when the selection signal SEL1 delayed by the buffer 142 for one base clock cycle with respect to the branch-destination signal RCLR becomes H level, the selector 133 receives data of 36 bits in total; namely 4-bit status information indicating the type of the trace event concerning the CPU output from the status information generation circuit 137, 16-bit branch-source address data output from the latch circuit 138, and 16-bit branch-destination address data output from the latch circuit 140, and selects the signals to be output therefrom. Thereafter, when the write signal TRW1 provided from the AND gate 143 as an ANDed signal of the selection signal SEL1 and the base clock P1 becomes H level, 36-bit data composed of the status information, the branch-source address data and the branch-destination address data is stored in the trace memory 134. Then, when the synchronous signal SYNC for tracing becomes H level, the trace data output circuit 135 synchronizes with the clock CLK for tracing, and reads out the trace data from the trace memory 134, and sequentially outputs the trace data from the data signal terminal "DATA" per every 4 bits. Various data are output from the data signal terminal "DATA" in the order of status information ST, branch-source address (ASHH, ASHL, ASLH, ASLL), and branch-destination address (ADHH, ADHL, ADLH, ADLL). In other words, trace data related to the branch event in response to a branch instruction is output in 9 CLK cycles from the 4-bit data signal terminal "DATA". It is to be noted that each of the symbols attached to the above addresses; namely HH, HL, LH, and LL means the location of data within the entire 16-bit data, wherein the data location is shifted from the uppermost 4-bit string HH to the lowermost 4-bit string in the order of HH, HL, LH, and LL.

FIG. 17 is a block diagram showing the inner construction of the trace control circuit 115 shown in FIG. 14, focussing on the circuit portion related to generation of the CPU access event. In FIG. 17, the same reference numerals as those in FIG. 15 indicate same or similar portions, so that the detailed explanation thereabout is omitted here. In this trace control circuit also, length of address data is 16 bits, and the length of address data is also 16 bits. In FIG. 17, numeral 151 denotes a status information generation circuit, 152 denotes a selector, 153 denotes an address data latch circuit for latching 16-bit address data, 154 denotes an AND gate, 155 denotes a read or write data latch circuit for latching 16-bit read or write data, 156 denotes an AND gate, 157, 158, 159 and 160 all denote latch circuits for latching 1-bit data and numeral 161 denotes an AND gate.

Next, the operation of the above-mentioned trace circuit is now explained as below.

FIG. 18 is a timing chart showing the waveshapes of various signals regarding the trace control circuit. In FIG. 18, the same reference numerals as those in FIG. 16 indicate same or similar portions, so that the detailed explanation thereabout is omitted here. Reference character RDA denotes a data access request signal from the CPU, DB denotes an output data to the data bus, AD_CLK denotes an address latching signal, DT_CLK denotes a data latch signal, SEL2 denotes a selection signal, TRW2 denotes a write signal into the trace memory 134. As shown in FIG. 18, when the address latch signal AD_CLK, which is provided from the AND gate 154 as an ANDed signal of the data access request signal RDA and the base clock P1, becomes H level, the address data output to the address bus ADCPU of the CPU is latched by the latch circuit 153. Then, when the data latch signal DT_CLK becomes H level, wherein the data latch signal DT_CLK is provided as an ANDED signal of the base clock P1 and the data access request signal RDA which is delayed for 1 base clock signal cycle by the latch circuits 157 and 158 on the basis of the operation of the AND gate 156, the read or write data output to the data bus DB is latched by the latch circuit 155. Thereafter, when the selection signal SEL2 becomes H level, which selection signal being delayed for 2 clock signal cycles with respect to the data access request signal RDA by the latch circuits 157, 158, 159 and 160, the selector 133 receives 36-bit data in total; namely 4-bit status information output from the status information generation circuit 151, 16-bit address data output from the latch circuit 153, and 16-bit read or write data output from the latch circuit 155, and selects the signals to be output therefrom. Then, when the write signal TRW2 provided from the AND gate 161 as an ANDed signal of the selection signal SEL2 and the base clock signal P1 becomes H level, those 36-bit data composed of the status information, address data, and read or write data are stored in the trace memory 134. Thereafter, when the synchronous signal SYNC for tracing becomes H level, the trace data output circuit 135 synchronizes with the clock signal CLK for tracing, and reads out the trace data from the trace memory 134, and sequentially outputs the trace data per every 4 bits. Various data are output from the data signal terminal "DATA" in the order of the status information ST, the address data (AHH, AHL, ALH, ALL), and the read or write data (DHH, DHL, DLH, DLL). In other words, the trace data related to the CPU-access event is output in 9 CLK cycles from the 4-bit data signal terminal "DATA" in response to a data access instruction.

Since a microcomputer carrying a conventional decoding circuit therein is configured as such, there has been such a problem that when the number of address busses and/or data busses is increased, or an instruction execution cycle is shortened, the number of trace busses should be increased, or the frequency of trace-use clock signal should be made higher, in a case where the real-time operation of the CPU is required.

SUMMARY OF THE INVENTION

The present invention has been proposed to solve the problems aforementioned, and it is an object of the present invention to provide a trace control circuit capable of tracing the operation of a CPU in real time.

The trace control circuit according to a first aspect of the present invention is constructed in such a manner that it comprises: a branch event generation circuit for outputting trace data related to a branch instruction in response to a branch instruction, a CPU-access event generation circuit for outputting a trace data related to a data access instruction in response to a data access instruction, a selection means capable of inputting at least trace data output from the branch-event generation circuit and trace data output from the CPU-access event generation circuit, and selecting trace data related to either one of these events, a memory means for storing the trace data, and a trace data abbreviation means that abbreviates one part of the trace data and outputs the partly abbreviated trace data, wherein the branch event generation circuit further comprises an address abbreviation information generation means for detecting an overlapped portion of a branch-source address with a branch-destination address from the upper bit sides thereof, and generating a branch-destination address abbreviation information.

The trace control circuit according to another aspect of the present invention is constructed in such a manner that the branch-event generation circuit further comprises one or more than one first latching means for respectively latching address data per predetermined number of bits, one or more than one second latching means for delaying the address data for a predetermined base clock cycles from the first latching means and respectively latching the data per predetermined number of bits, and one or more than one comparing means each for comparing the data latched by the first latching means with the data latched by the second latching means per predetermined number of bits, and outputting the result of the comparison to the address abbreviation information generation means.

The trace control circuit according to another aspect of the present invention is constructed in such a manner that it comprises: a branch event generation circuit for outputting trace data related to a branch instruction in response to a branch instruction, a CPU-access event generation circuit for outputting a trace data related to a data access instruction in response to a data access instruction, a selection means capable of inputting at least trace data output from the branch-event generation circuit and trace data output from the CPU-access event generation circuit, and selecting trace data related to either one of these events, a memory means for storing the trace data, and a trace data abbreviation means that abbreviates one part of the trace data and outputs the partly abbreviated trace data, wherein the CPU-access event generation circuit further comprises an address abbreviation information generation means for detecting an overlapped portion of a preceding address to be accessed with a succeeding address to be accessed next from the upper bit sides thereof in the case of consecutive data access, and generating succeeding address abbreviation information.

The trace control circuit according to another aspect of the present invention is constructed in such a manner that the CPU-access event generation circuit further comprises one or more than one first latching means for respectively latching address data per predetermined number of bits, one or more than one second latching means for delaying address data for a predetermined base clock cycles from the first latching means and respectively latching per predetermined number of bits, and one or more than one comparing means each for comparing the data latched by the first latching means with the data latched by the second latching means per predetermined number of bits, and outputting the result of the comparison to the address abbreviation information generation means.

The trace control circuit according to another aspect of the present invention is constructed such that the trace data abbreviation means further comprises a register capable of reading out and storing a trace data related to one of the above trace events from the trace data abbreviation means, a plurality of switching means disposed between each of storage means composing the register and an output section of the trace data abbreviation means, and a control means which is connected to a control terminal of each of the plurality of switching means and executes an on-off control per a predetermined number of bits as a base unit for data abbreviation on the basis of the address abbreviation information.

The trace control circuit according to further aspect of the present invention is constructed in such a manner that it comprises: a branch event generation circuit for outputting a trace data related to a branch instruction in response to branch instruction, a CPU-access event generation circuit for outputting a trace data related to a data access instruction in response to a data access instruction, a selection means capable of inputting at least trace data output from the branch-event generation circuit and trace data output from the CPU-access event generation circuit, and selecting trace data related to either one of these events, a memory means for storing the trace data, and a trace data abbreviation means that abbreviates one part of the trace data and outputs the partly abbreviated trace data, wherein the CPU-access event generation circuit further comprises one or more than one latching means for latching read or write data respectively per predetermined number of bits, one or more than one comparing means each for comparing the bit strings held by the one or more than one latching means per predetermined number of bits with a predetermined abbreviation target bit string, and a data abbreviation information generation circuit that inputs the result of the comparison output from one or more than one the comparing means and generates abbreviation information per predetermined number of bits of data related to the read or write data.

The trace control circuit according to still further aspect of the present invention is constructed such that the trace data abbreviation means further comprises a register capable of reading and storing a trace data related to either one of the branch event of the CPU-access event from the memory means, a plurality of switching means disposed between each of the memory elements composing the register and an output section of the trace data abbreviation means, and a control means that is connected to a control terminal of each of the plurality of switching means and executes an on-off control per a predetermined number of bits as a base unit for data abbreviation, on the basis of the address abbreviation information.

DETAILED DESCRIPTION OF THE PREFERRED EMBODIMENTS

Several embodiments of the present invention are now explained below.

(First Embodiment)

Figure 16:
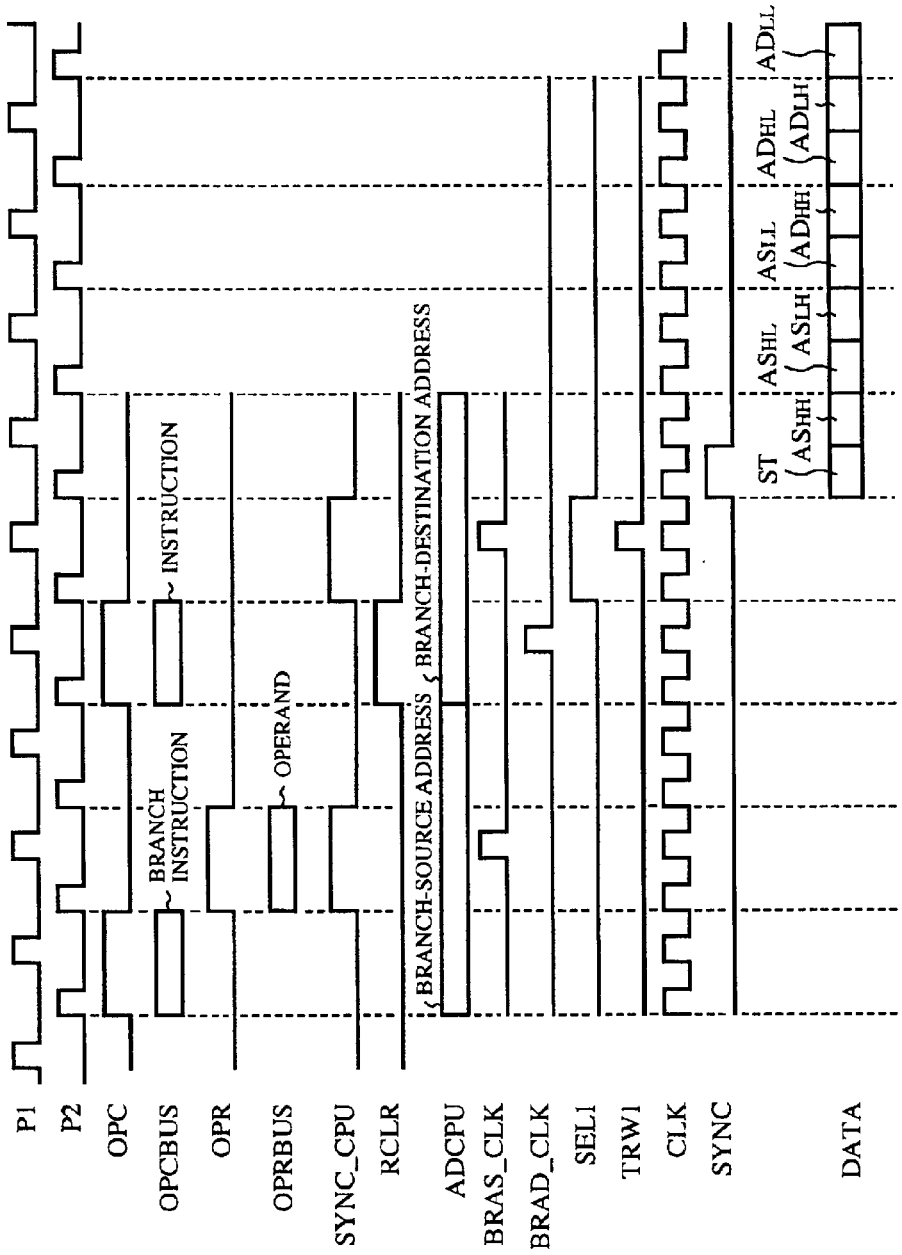
FIG. 16 is a timing chart showing waveshapes of various signals related to the trace control circuit shown in FIG. 15.
Figure 17:
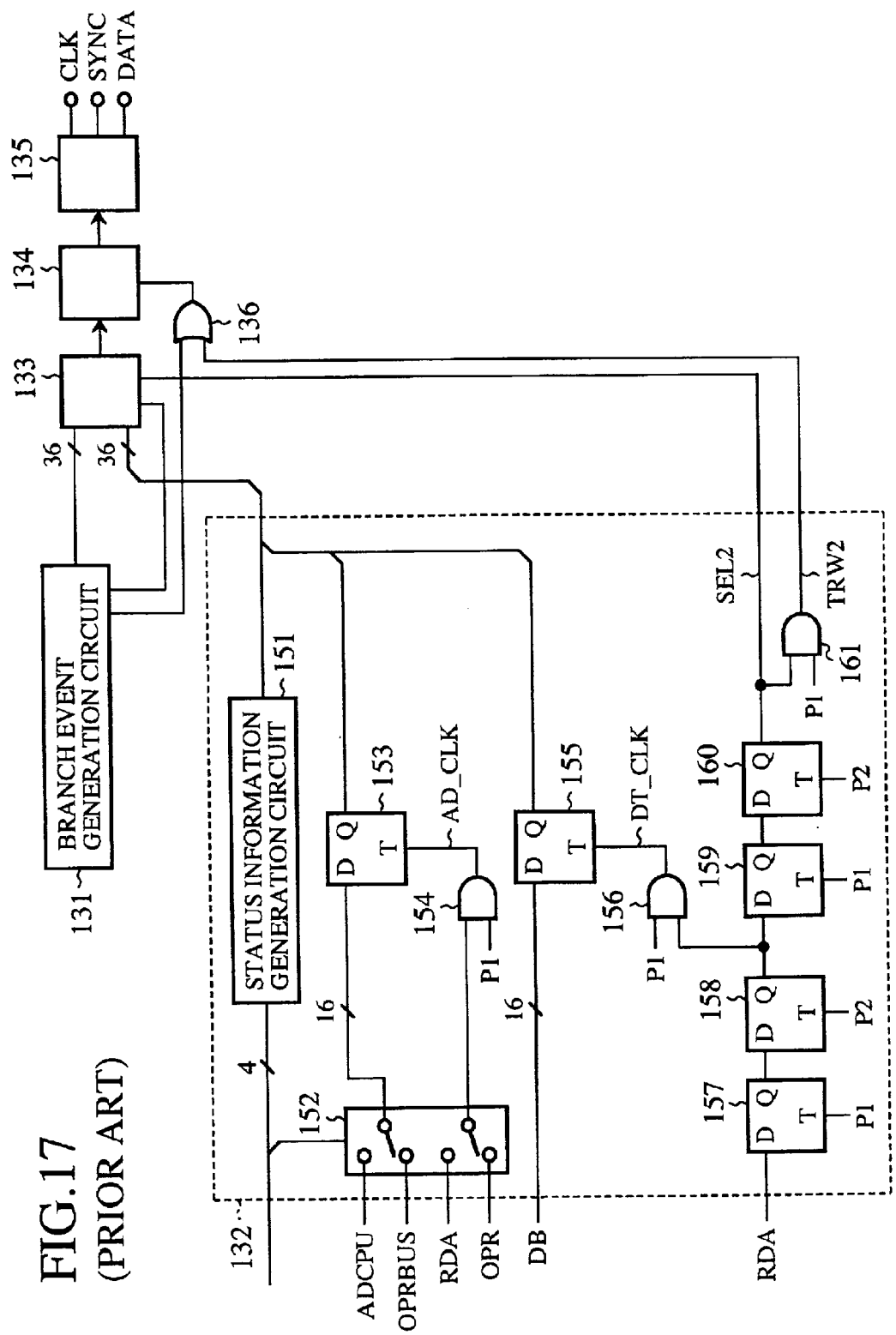
FIG. 17 is a block diagram showing the inner configuration of the trace control circuit shown in FIG. 14.

In the conventional trace control circuit, when a branch instruction is executed, trace data related to a branch-source address and a branch-destination address are output by use of absolute addresses as shown in FIG. 16. However, there is also a branch instruction using a relative addresses for executing a branch operation, and in such a case, the upper bit side of the branch-source address and that of the branch-destination address coincide with each other in many cases.

Hence, the trace control circuit according to a first embodiment of the present invention abbreviates, in the case in which a branch-destination address contains the same upper bit portion as that of a branch-source address in the trace data stored in the trace memory, the same bit string in the upper bit side of the branch-destination address from the trace data, and externally outputs the partly abbreviated trace data.

Figure 1:
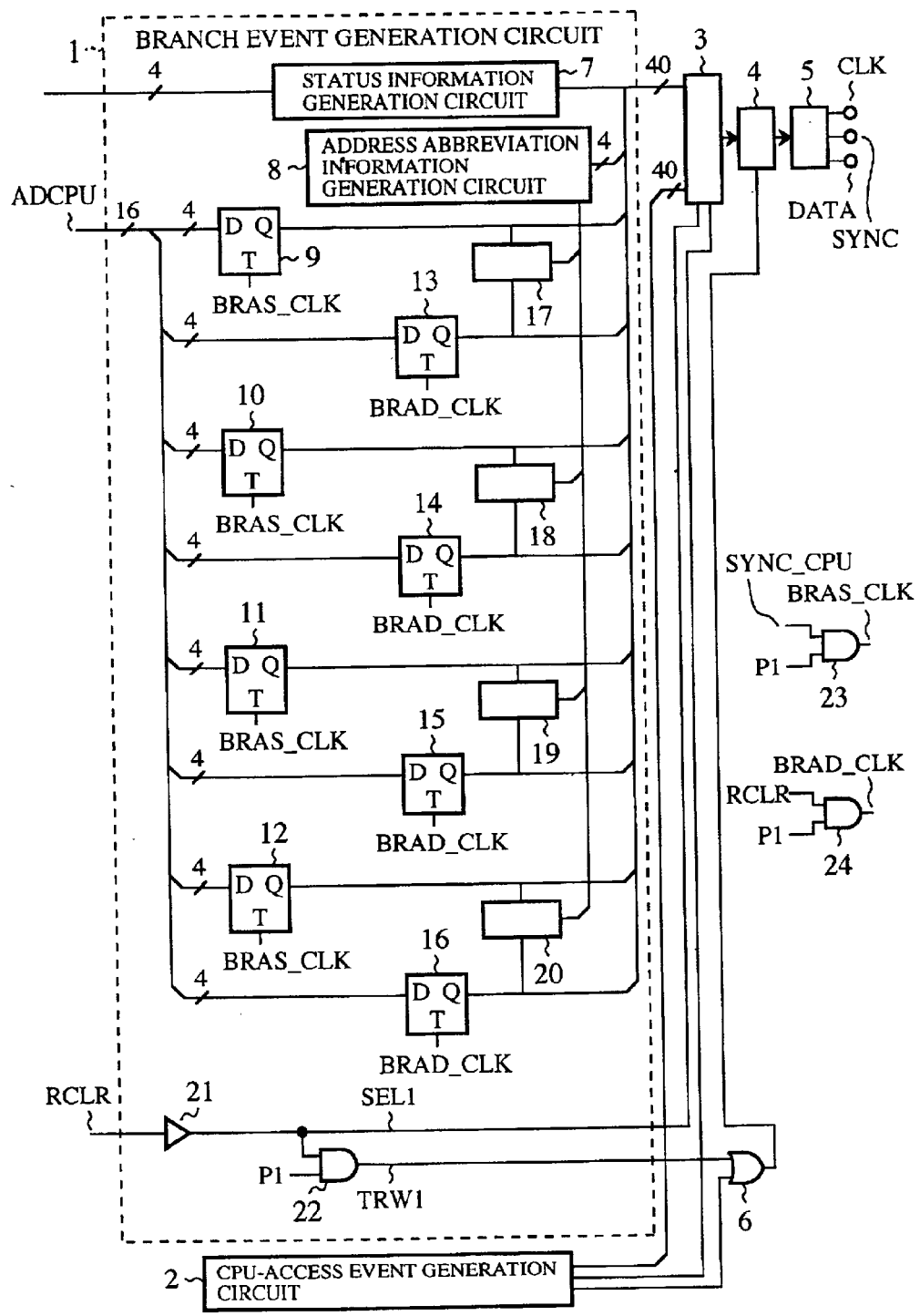
FIG. 1 is a schematic diagram showing the configuration of a trace control circuit according to a first embodiment of the present invention.

FIG. 1 is a schematic diagram showing the configuration of a trace control circuit according to a first embodiment of the present invention, focussing on the circuit portion related to generation of the branch event. In FIG. 1, numeral 1 denotes a branch-event generation circuit for outputting the trace information related to a branch instruction, 2 denotes a CPU-access event generation circuit for outputting the trace information related to a data access instruction, 3 denotes a selector (selection means) capable of selecting and outputting either one of the data output from the branch event generation circuit 1 or that output from the CPU-access event generation circuit 2, 4 denotes a trace memory for storing the trace data, 5 denotes a trace data abbreviation circuit (trace data abbreviation means) that reads out the trace data from the trace memory 4 abbreviates one part of the data, and sequentially outputs the trace data excluding the abbreviated part for 4 bits at each time, 6 denotes an OR gate, 7 denotes a status information generation circuit that receives a control signal form the CPU and generates 4-bit status information related to the trace event, 8 denotes an address abbreviation information generation circuit (address abbreviation information generation means) for generating 4-bit branch-destination address abbreviation information, numerals 9, 10, 11 and 12 all denote branch-source address data latch circuits (first latching means) for latching 4-bit data, numerals 13, 14, 15 and 16 all denote branch-destination address data latch circuits (second latching means) for that latching 4-bit data, numerals 17, 18, 19 and 20 all denote comparators (comparing means) for respectively comparing; the data of the latch circuit 9 and that of the latch circuit 13, the data of the latch circuit 10 and that of the latch circuit 14, the data of the latch circuit 11 and that of the latch circuit 15, and the data of the latch circuit 12 and that of the latch circuit 16, numeral 21 denotes a buffer for delaying the signal for one base clock signal cycle, and numerals 22, 23 and 24 all denote AND gates. Note that each of the signal terminals "CLK", "DATA" and "SYNC" connected to the trace data abbreviation circuit 5 has the same functions as those of the terminals of the microcomputer of the conventional use shown in FIG. 14. Further, the microcomputer provided with the trace control circuit of this first embodiment is configured in the same manner as that of the microcomputer shown in FIG. 14, so that the explanation of the entire construction thereof is omitted here.

Next, the operation of the trace control circuit according to the first embodiment of the present invention is now explained below.

Figure 2:
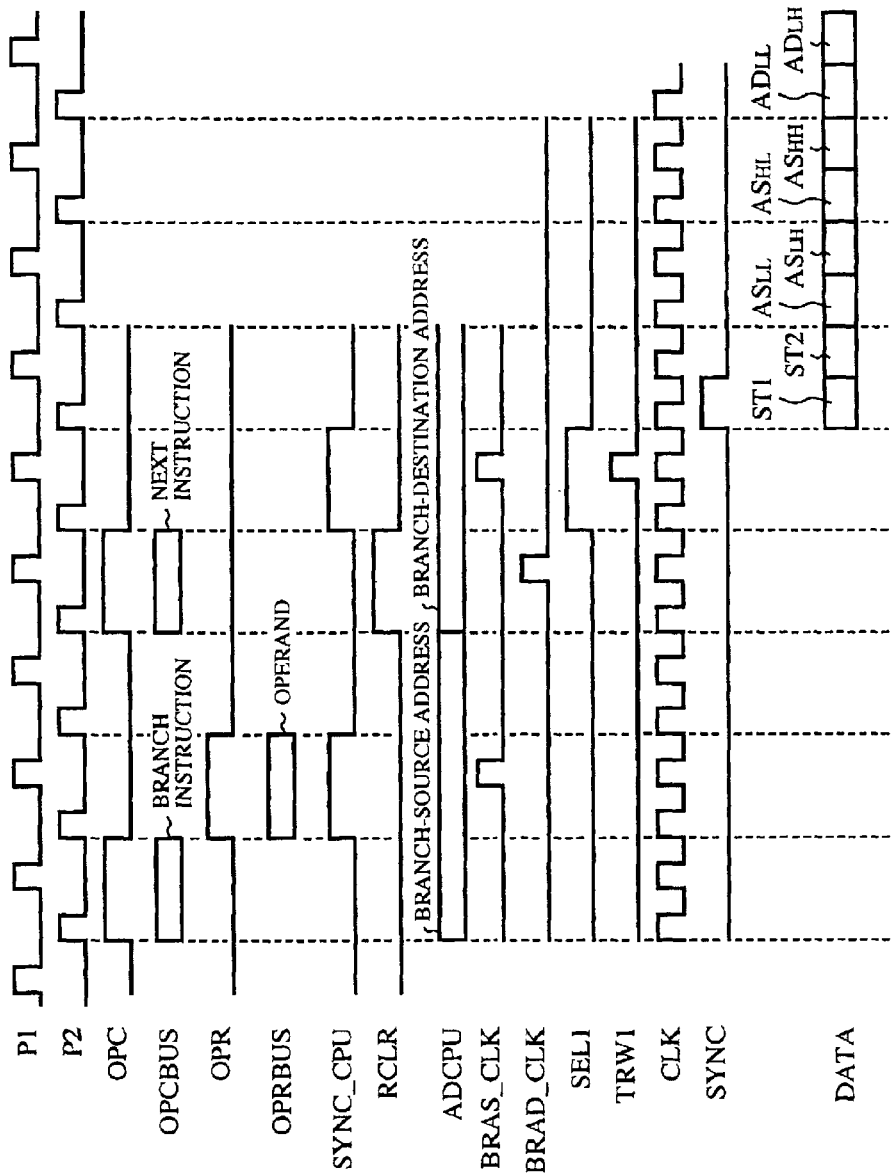
FIG. 2 is a timing chart showing waveshapes of various signals related to the trace control circuit of the first embodiment.

FIG. 2 is a timing chart showing waveforms of various signals related to the trace control circuit of the first embodiment of the present invention. In FIG. 2, reference characters P1 and P2 denote base clock signals of the CPU, OPC denotes an ope-code fetch signal at the instruction execution time, OPCBUS denotes an output data to the ope-code bus, OPR denotes an operand fetch signal at the instruction execution time, OPRBUS denotes an output data to the operand bus, SYNC_CPU denotes a synchronous signal at the instruction execution time, RCLR denotes a branch-destination signal, ADCPU denotes an output data to the address bus (16 bits), BRAS_CLK denotes a branch-source address latch signal that becomes active when latching the branch-source address data into the latch circuits 9, 10, 11 and 12 per 4 bits each, BRAD_CLK denotes a branch-destination address latch signal that becomes active when latching the branch-destination address data into the latch circuits 13, 14, 15 and 16 per 4 bits each, SEL1 denotes a selection signal that becomes active when making the selector 3 select the output data from the branch event generation circuit 1 and output the thus selected data, TRW1 denotes a write signal that becomes active when writing the output data from the branch event generation circuit 1 into the trace memory 4, CLK denotes a clock signal for tracing, SYNC denotes a synchronous signal used for taking synchronization when outputting the trace data, and DATA denotes a trace data output from the data signal terminal.

At the execution of branch instruction, first the status information generation circuit 7 inputs a control signal from the CPU, and generates 4-bit status information ST1 which is information related to the type of trace event or the like. This status information is decoded by a decoding operation performed by an external debugger disposed outside the microcomputer so that an appropriate operation is performed thereby. Thereafter, when the branch-source address latch signal BRAS_CLK provided as an ANDed value of the synchronous signal SYNC_CPU and the base clock signal P1 output from the AND gate 23 becomes H level, the branch-source address data output to the address bus ADCPU of the CPU is latched by the latch circuits 9, 10, 11 and 12 per 4 bits each. Thereafter, when the branch-destination address latch signal BRADS_CLK provided as an ANDed value of the branch-destination signal RCLR and the base clock signal P1 output from the AND gate 24 becomes H level, the branch-destination address data output to the address bus ADCPU of the CPU is latched by the latch circuits 13, 14, 15 and 16 per 4 bits each. Thereafter, the comparators 17, 18, 19 and 20 each compares the branch-source address and the branch-destination address per 4 bits each, and outputs the result of the comparison to the address abbreviation information generation circuit 8. This address abbreviation information generation circuit 8 generates branch-destination address abbreviation information ST2 on the basis of the result of the comparisons.

Thereafter, when the selection signal SEL1 delayed by the buffer 21 for one base clock cycle with respect to the branch-destination address signal becomes H level, the selector 3 receives 40-bit data in total; namely 4-bit status information output from the status information generation circuit 7, 4-bit branch-destination address abbreviation information output from the address abbreviation information generation circuit 8, 4-bit branch-source address data output respectively from each of the latch circuits 9, 10, 11 and 12, and 4-bit branch-destination address data output respectively from each of the latch circuits 13, 14, 15 and 16, and selects the signals to be output therefrom.

Thereafter, when the write signal TYRW1 provided as an ANDed signal of the selection signal SEL1 and the base clock signal P1 from the AND gate 22 becomes H level, 40-bit data composed of the status information, the branch-destination address abbreviation information, the branch-source address data and the branch-destination address data is written into the trace memory 4. Thereafter, when the synchronous signal SYNC for tracing becomes H level, the trace data circuit 5 reads out the data from the trace memory 4, and sequentially outputs trace data from the data signal terminal "DATA" in synchronism with the clock signal CLK for tracing per 4 bits at each time. On this occasion, the trace data abbreviation circuit 5 abbreviates overlapped bit strings of the branch-source address with those of the branch-destination address sequentially from the upper address sides thereof, and outputs the partly abbreviated trace data. Various data are output from the data signal terminal "DATA" in the order of the status information ST1 that indicates the type of the trace event, the branch-destination address abbreviation information ST2, branch-source address (ASLL, ASLH, ASHL, ASHH), and the branch-destination address (ADLL, ADLH, ADHL, ADHH), some part of which has been abbreviated. On this occasion, due to the fact that the branch-destination address abbreviation information ST2 indicates that the upper 8-bit portion of the branch-destination address coincides with that of the branch-source address, the trace data with this upper 8-bit portion of the branch-destination address being abbreviated is output. For this reason, by employing the above circuit configuration, although 9 clock signal cycles for tracing (hereinafter may be referred to as "CLK cycle" or just as "CLK") have been required conventionally for outputting the trace data related to the branch event, the minimum required cycle can be reduced to only 6 cycles (8 cycles in the above case).

Next, the trace data abbreviation circuit for performing abbreviation of address data related to the branch-destination address is explained into detail as below.

Figure 3:
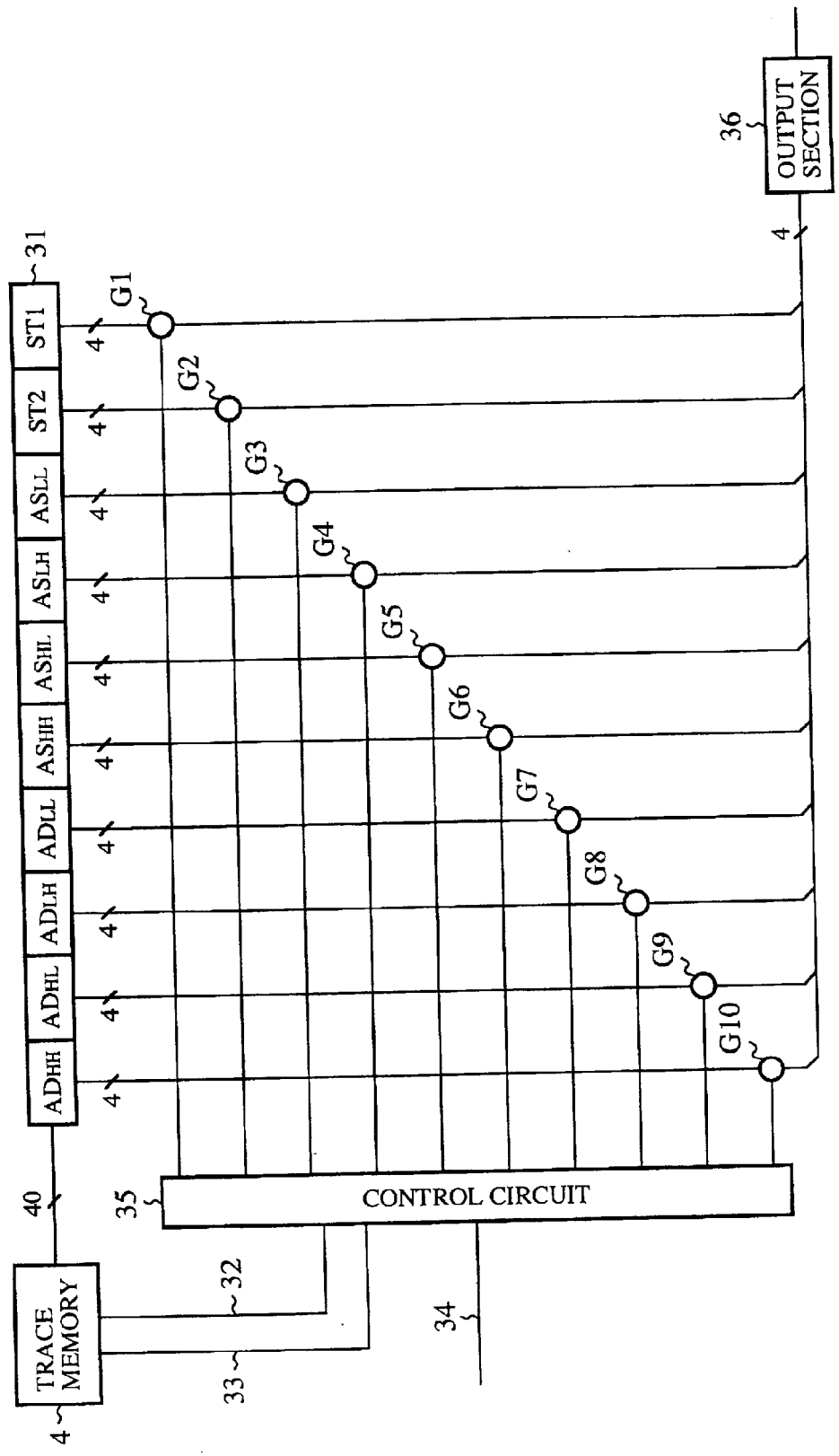
FIG. 3 is a block diagram showing the inner configuration of the trace data abbreviation circuit shown in FIG. 1.

FIG. 3 is a block diagram showing the inner configuration of the trace data abbreviation circuit shown in FIG. 1. In FIG. 3, numeral 4 denotes a trace memory, 31 denotes a register that reads out the trace data related to the branch event from the trace memory 4 and momentarily stores the thus read data, 32 denotes a signal line for transmitting the branch-destination address abbreviation information, 33 denotes a signal line for transmitting the read request signal, 34 denotes a signal line for transmitting a control signal from the CPU, G1 to G10 denote transmission gates (switching means), 35 denotes a control circuit (control means) that inputs branch-destination address abbreviation information by way of the signal line 32, and also inputs a control signal from the CPU by way of the signal line 34, and thereafter outputs a read request signal and gate signals to be input to each of the transmission gates G1 to G10, and numeral 36 denotes an output section for outputting the trace data per 4 bits each.

Next, the operation of the trace data abbreviation circuit is now explained as below.

Figure 4:
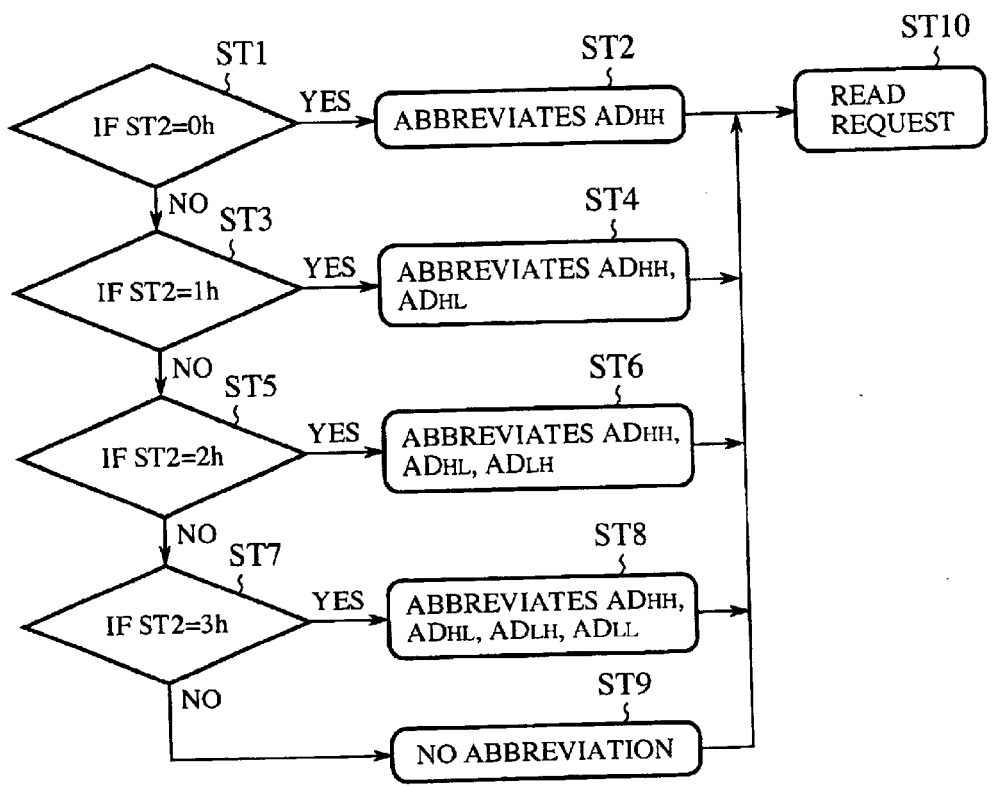
FIG. 4 is a flowchart showing the abbreviation process of the trace data on the basis of the branch-destination address abbreviation information.

FIG. 4 is a flowchart showing the abbreviation process of the trace data in accordance with the branch-destination address information ST2. The control circuit 35 reads out the branch-destination address abbreviation information ST2 by way of the signal line 32. Thereafter, the control circuit 35 determines whether the branch-destination address abbreviation information ST2 is "0000" in step ST1. If the branch-destination address abbreviation information ST2 is "0000", the procedure goes to step ST2 and sets such that the upper 4-bit portion ADHH of the branch-destination address is abbreviated, whereas if the branch-destination address abbreviation information ST2 is not "0000", then the procedure goes to step ST3 and determines whether the branch-destination address abbreviation information ST2 is "0001". If the branch-destination address abbreviation information ST2 is "0001", the procedure goes to step ST4 and sets such that the upper 8-bit portion ADHH, ADHL of the branch-destination address data is abbreviated, whereas if the branch-destination address abbreviation information ST2 is not "0001", then the procedure goes to step ST5 and determines whether the branch-destination address abbreviation information ST2 is "0010". If the branch-destination address abbreviation information ST2 is "0010", the procedure goes to step ST6 and sets such that the upper 12-bit portion ADHH, ADHL and ADLH of the branch-destination address data is abbreviated, whereas if the branch-destination address abbreviation information ST2 is not "0010", then the procedure goes to step ST7 and determines whether the branch-destination address abbreviation information ST2 is "0011". Further, if the branch-destination address abbreviation information ST2 is "0011", the procedure goes to step ST8 and sets such that all the 16-bit data ADHH, ADHL, ADLH and ADLL of the branch-destination address is abbreviated, whereas if the branch-destination address abbreviation information ST2 is not "0011", then the procedure goes to step ST9 and sets in such a manner that no data abbreviation is executed about the branch-destination address data. Thereafter, when the abbreviation format is determined about the branch-destination address information in each of the steps ST2, ST4, ST6, and ST8 or ST9, the control circuit 35 sends a request signal to the register 31 for reading out the trace data from the trace memory 4.

Figure 5:
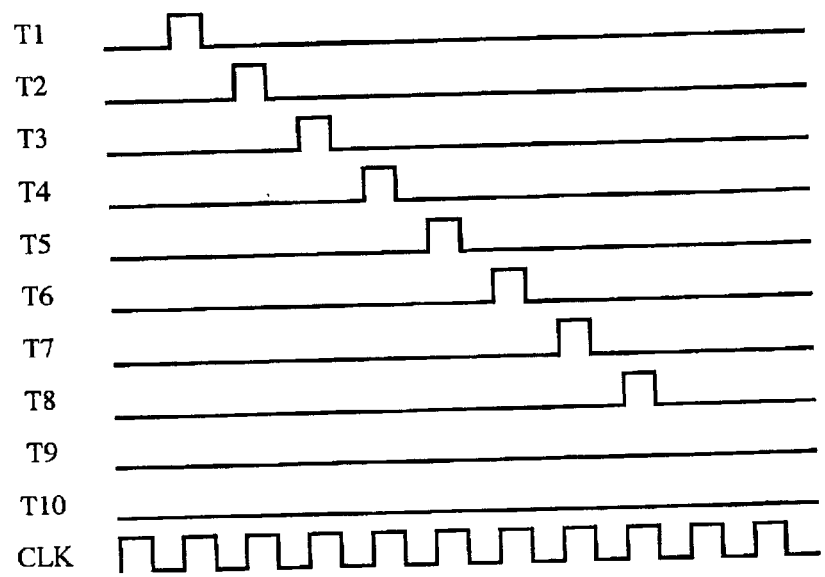
FIG. 5 is a timing chart showing an example of waveshapes of the gate signals respectively input to each of the transmission gates.

When the trace data is read out into the register 31, the control circuit 35 performs an ON-OFF control of each of the transmission gates in synchronism with the clock signal CLK for tracing, so that the trace data is output per bits at each time in the order of the status information ST1, the branch-destination address abbreviation information ST2, the branch-source address data (ASLL, ASLH, ASHL, ASHH) and the branch-destination address data (ADLL, ADLH, ADHL, ADHH). On this occasion, if the upper 4-bit portion (ADHH) of the branch-destination address data is to be abbreviated, the control circuit 35 holds the transmission gate G10 in the OFF state, and if the upper 8-bit portions (ADHH, ADHL) of the branch-destination address data is to be abbreviated, the control circuit 35 holds the transmission gates G9 and G10 in the OFF state, and if the upper 12-bit portion (ADHH, ADHL, ADLH) of the branch-destination address data is to be abbreviated, the control circuit 35 holds the transmission gates G8, G9 and G10 in the OFF state, and finally if the whole 16-bit portion (ADHH, ADHL, ADLH, ADLL) of the branch-destination address data is to be abbreviated, the control circuit 35 holds the transmission gates G7, G8, G9 and G10 in the OFF state. FIG. 5 is a timing chart showing the example of waveshapes of each of the gate signals T1 to T10 respectively input to the corresponding transmission gates G1 to G10. Here, the case in which the upper 8-bit portion (ADHH, ADHL) of the branch-destination address data is to be abbreviated is taken up as an explanatory example. As shown in FIG. 5, first the gate signals T1 to T8 are set to H level in order in synchronism with the clock signal CLK for tracing, and the transmission gates G1 to G8 are thereby set to ON, and thereafter 8-packet trace data including the status information ST1, the branch-destination address abbreviation information ST2, the branch-source address data (ASLL, ASLH, ASHL, ASHH) and the branch-destination address data (ADLL, ADLH) is output.

As explained above, since the trace control circuit according to this first embodiment of the present invention is constructed in such a manner that it comprises a branch event generation circuit 1 having an address abbreviation information generation circuit 8 for detecting a portion in which the branch-source address and the branch-destination address are overlapped with each other and generating the branch-destination address abbreviation information on the basis of the result of the detection, and a trace data abbreviation circuit 5 for performing abbreviation of one part of trace data on the basis of the branch-destination address abbreviation information and outputting the partly abbreviated trace data, whereby the number of data packets of the trace data can be reduced to speed up the output operation of the trace data, so that the ability to output trace data in real time can be greatly improved.

Further, it is constructed such that the branch-event generation circuit 1 comprises latch circuits 9, 10, 11 and 12 for latching the address data per 4 bits for each, latch circuits 13, 14, 15 and 16 for latching the address data per 4 bits for each, which address data being delayed for predetermined one base clock cycle from these latch circuits 9, 10, 11 and 12, and comparators 17, 18, 19 and 20 that compare the data held by the latch circuits 9, 10, 11 and 12 with the data held by the latch circuits 13, 14, 15 and 16, and outputs the result of the comparison to the address abbreviation information generation circuit 8, so that the overlapped portion of the address data of the branch-source address with that of the branch-destination address can be detected by per every 4 bits, whereby in comparison with the case in which address data is simply sectioned into the upper address group and the lower address group to detect the overlapped portion thereof, more variation can be provided to the patterns for detecting the overlapped portion of the address data, and the number of omittable data packets with the trace data can be increased, whereby the output operation of the data can be made much faster.

Further, since the trace data abbreviation circuit 5 comprises a register 31 capable of reading out the trace data related to the branch event from the trace memory 4 and storing therein, transmission gates G1 to G10 disposed between the register 31 and the output section 36 in a manner sectioned per 4 bits each per 4 bits each time, and a control circuit 35 that is connected to each of the transmission gates G1 to G10 and performs ON-OFF control of the transmission gates G1 to G10 by outputting gate signals T1 to T10, if the control circuit 35 controls the timing for setting to the active mode the gate signals input to the transmission gates corresponding to each of the bit strings to be traced out, it can be readily executed that the bit strings related to the address data disposed in an arbitrary position within the trace data can be abbreviated, and the bit strings other than the thus abbreviated bit strings can be sequentially output as the trace data.

(Second Embodiment)

Figure 18:
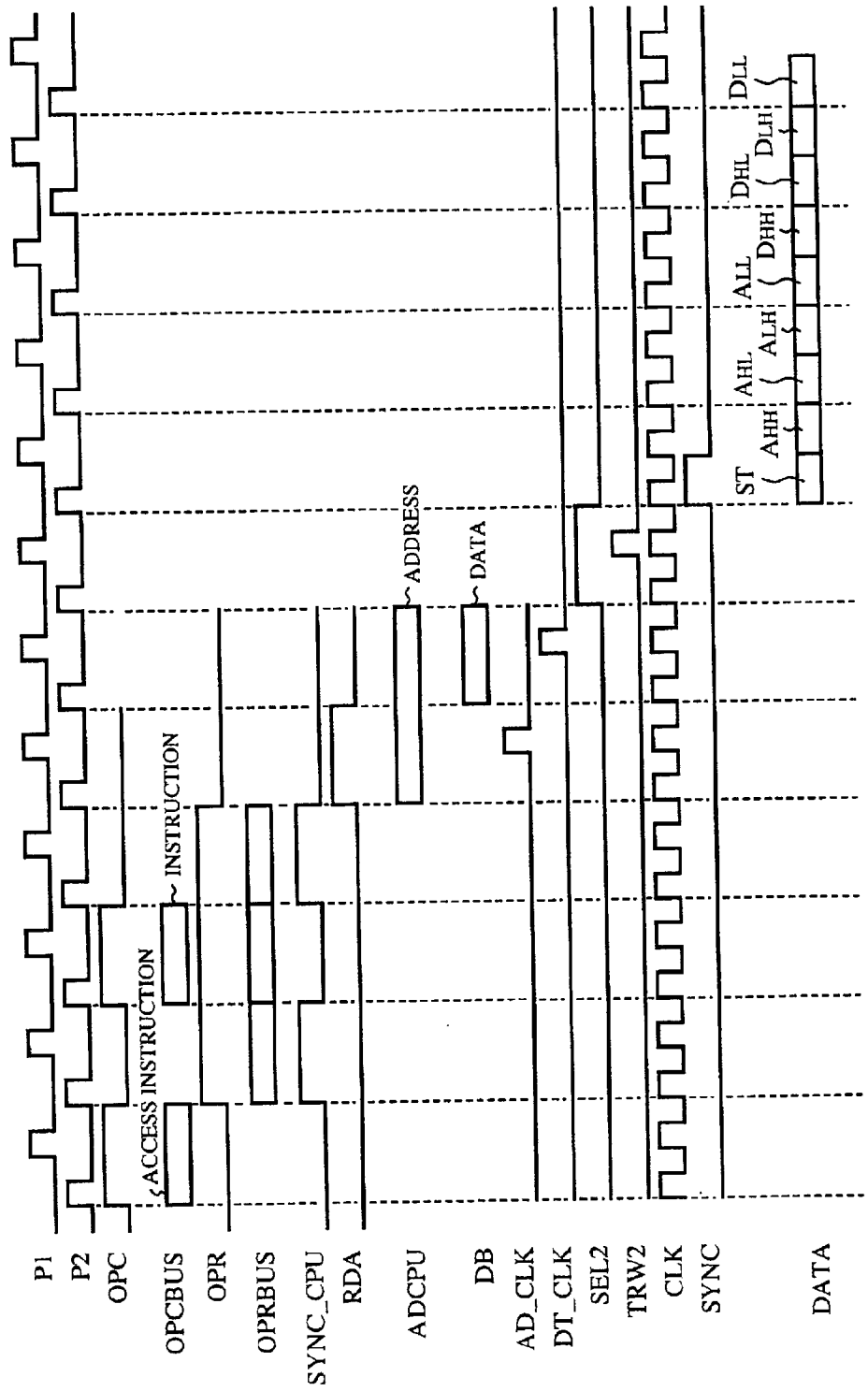
FIG. 18 is a timing chart showing waveshapes of various signals related to the trace control circuit shown in FIG. 17.

In the conventional control circuit, when a data access instruction is executed, the trace data is output by use of absolute addresses as shown in FIG. 18. However, some data access instructions perform data access by use of relative addresses, in which when consecutive data access instructions are executed, the upper side of the proceeding data access address and that of the succeeding data access address following thereto are often equal to each other.

Considering the above fact, the trace data control circuit according to the second embodiment of the present invention abbreviates, in a case where the upper address bit portion of the succeeding address is same as that of the preceding address in the consecutive data access operation regarding the trace data stored in the trace memory, the bit strings in the upper address bit side of the succeeding address, and outputs only the bit strings other than the thus abbreviated bit strings as the trace data to the external side.

Figure 6:
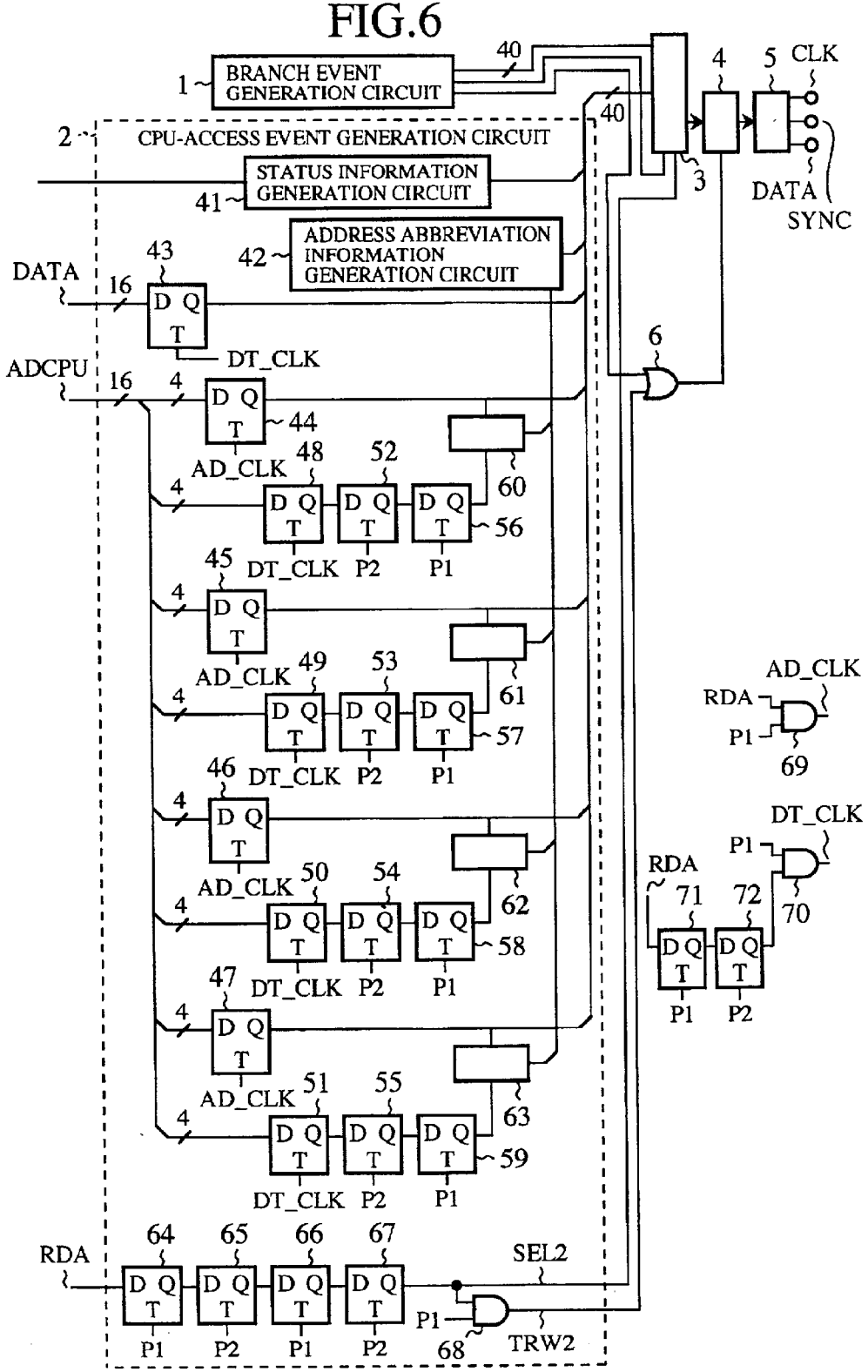
FIG. 6 is a schematic diagram showing the configuration of a trace control circuit according to a second embodiment of the present invention.

FIG. 6 is a circuit diagram showing the inner configuration of a trace control circuit according to the second embodiment of the present invention, focussing on the circuit portion related to the CPU-access event. In FIG. 6, the same reference numerals as those in FIG. 1 indicate same or similar portions, so that the detailed explanation thereabout is omitted here. Numeral 41 denotes a status information generation circuit that receives a control signal from the CPU and generates 4-bit status information related to the trace event, 42 denotes a 4-bit address abbreviation information generation circuit (address abbreviation information generating means) for generating the address abbreviation information of the succeeding address, 43 denotes a read or write data latch circuit for latching 16-bit data, numerals 44, 45, 46 and 47 denote latch circuits for latching address data (first latch means), numerals 48, 49, 50 and 51 denote latch circuits for latching 4-bit data to delay output of the address data, numerals 52, 53, 54 and 55 denote latch circuits for latching 4-bit data to delay output of address data, numerals 56, 57, 58 and 59 denote latch circuits for latching address data (second latch means), numerals 60, 61, 62 and 63 denote comparators (comparing means) respectively comparing the data of the latch circuit 44 and that of the latch circuit 56, the data of latch circuit 45 and that of the latch circuit 57, the data of latch circuit 46 and that of the latch circuit 58, and the data of the latch circuit 47 and that of the latch circuit 59, numerals 64, 65, 66 and 67 denote latch circuits for latching 1-bit data, numeral 68, 69 and 70 denote AND gates, and 71 and 72 denote latch circuits for latching 1-bit data. Note that a microcomputer equipped with the trace control circuit according to the second embodiment has same configuration as that of the conventional microcomputer, so that the detailed explanation thereabout is omitted here.

Next, the operation of the trace control circuit as constructed above is now explained as below.

Figure 7:
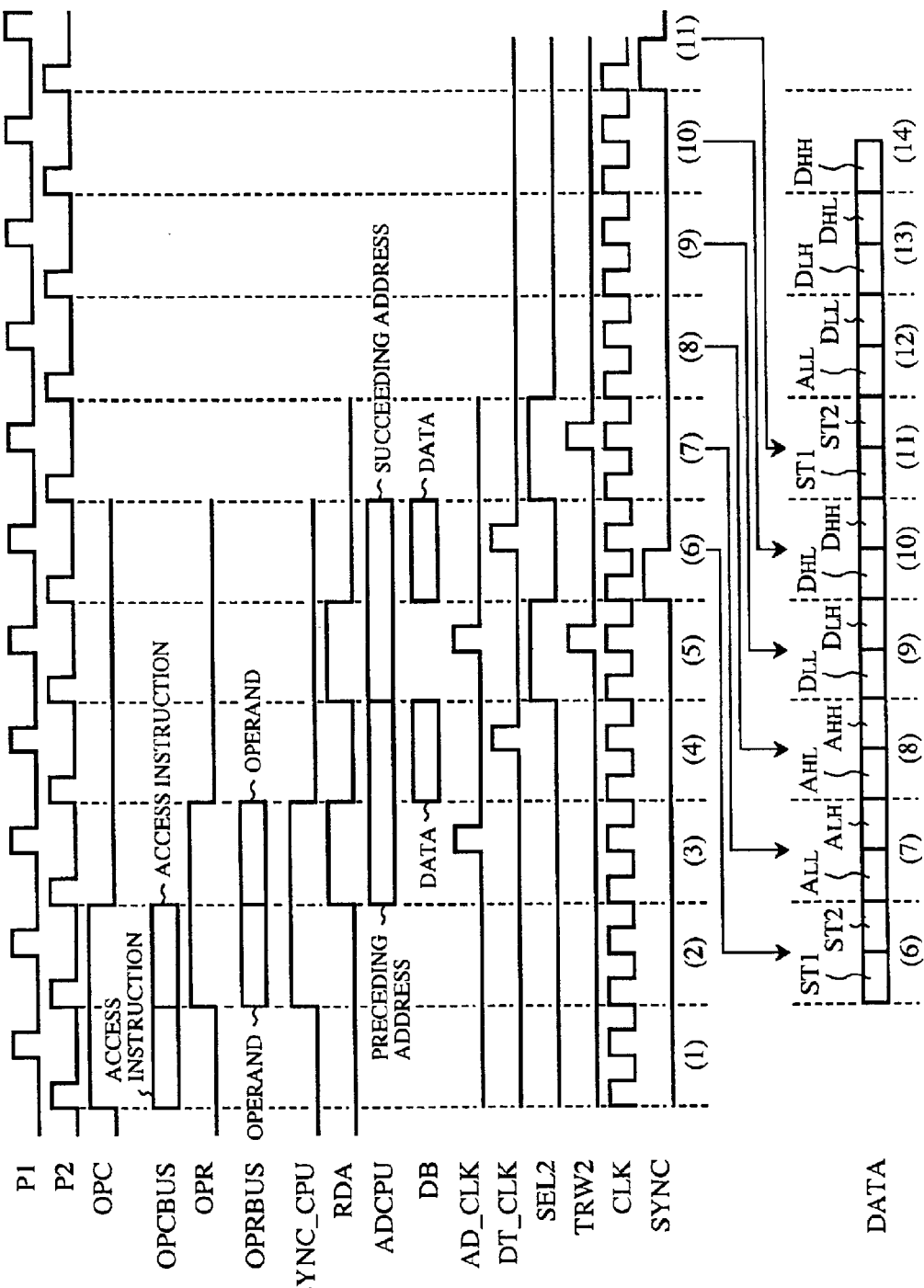
FIG. 7 is a timing chart showing waveshapes of various signals related to the trace control circuit of the second embodiment.

FIG. 7 is a timing chart showing waveshapes of various signals related to the trace control circuit according to this second embodiment of the present invention. In FIG. 7, the same reference numerals as those in FIG. 2 indicate same or similar portions, so that the detailed explanation thereabout is omitted here. Reference character RDA denotes a data access request signal, DB denotes an output data to the data bus, AD_CLK denotes an address latch signal that becomes active when making the latch circuits 44, 45, 46 and 47 latch the address data per 4 bits for each circuit, DT_CLK denotes an address latch signal that becomes active when making the latch circuits 43 latch read or write data, and also when making the latch circuits 48, 49, 50 and 51 latch address data per 4 bits for each circuit, SEL2 denotes a selection signal that is set to active when the selector 3 is made to select output data from the CPU-access event generation circuit 2 and output the thus selected data, and TRW2 denotes a write signal that is set to active when the output data from the CPU-access event generation circuit 2 is write into the trace memory 4.

Here, the operation for executing consecutive data access instructions is explained, referring sequentially to each cycle of the base clock signal as shown in FIG. 7, taking up the case in which there are addresses to be accessed from the upper sides thereof.

In the first cycle, the preceding first data access instruction is fetched. In the second cycle, the succeeding second data access instruction is fetched, and at the same time, the preceding address with respect to the first data access instruction is fetched. In the third cycle, the succeeding address with respect to the second data access instruction is fetched. Further, when the address latch signal AD_CLK, which is given as an ANDed value of the data access request signal RDA and the base clock signal P1 by the AND gate 69, becomes H level due to the fact that the data access request signal RDA has become H, the preceding address data output to the address bus ADCPU of the CPU is latched by the latch circuits 44, 45, 46 and 47, respectively per 4 bits each. Note that whenever the data access instruction is executed, the status information generation circuit 41 inputs a control signal from the CPU, and generates 4-bit status information which is information related to the type of the trace event. This status information is decoded by an external debugger disposed outside the microcomputer, and an appropriate processing is performed on the basis of the thus decoded information.

Next, in the fourth cycle, when the data latch signal DT_CLK given as an ANDed value of the data access request signal RDA delayed for one base clock cycle by the latch circuits 71 and 72 and the base clock signal P1 on the basis of the operation of the AND gate 70 becomes H level, the read or write data related to the preceding address output to the data bus DB is latched by the latch circuit 43. In the fifth cycle, when the selection signal SEL2 which is delayed for 2 basis clock cycles with respect to the data access request signal RDA by the latch circuits 64, 65, 66 and 67 connected in series becomes H level, the selector 3 selects and outputs 40-bit output data, which is related to the preceding address from the CPU-access event generation circuit 2 and composed of; the 4-bit status information ST1 indicating the type of the trace event output from the status information generation circuit 41, the 4-bit succeeding address abbreviation information ST2 output from the address information generation circuit 42, the 4-bit address data output respectively from the latch circuits 44, 45, 46, and 47, and the 16-bit read or write data output from the latch circuit 43.

Thereafter, when the write signal TRW2 which is given as an ANDed value of the selection signal SEL2 and the base clock signal P1 by the AND gate 68 becomes H level, the 40-bit data composed of the status information, the succeeding address abbreviation information, address data, and read or write data is write into the trace memory 4. Further, when the address latch signal AD_CLK becomes H level in accordance with the fact that the data access request signal RDA has become H level, the succeeding address data output to the address bus ADCPU of the CPU is latched by the latch circuits 44, 45, 46 and 47 per 4 bits each. On this occasion, by the delaying operation of the group of latch circuits 48, 52 and 56, the group of latch circuits 49, 53 and 57, the group of latch circuits 50, 54 and 58, and also another group of latch circuits 51, 55 and 59, which are connected in series as a whole, the preceding address data is latched by the respective latch circuits 56, 57, 58 and 59 per 4 bits each. The comparators 60, 61, 62 and 63 compare the succeeding address data latched by the latch circuits 44, 45, 46 and 47 with the preceding address data latched by the latch circuits 56, 57, 58 and 59 per 4 bits each and outputs the result of the comparison to the address abbreviation information generation circuit 42. This address abbreviation information generation circuit 42 generates succeeding address abbreviation information ST2 on the basis of the comparison result.

Next, in the sixth cycle, when the data latching signal DT_CLK becomes H level, read or write data related to the succeeding address output to the data bus DB is latched by the latch circuit 43. Further, at the timing when the synchronous signal SINC for tracing becomes H level, the trace data abbreviation circuit 5 synchronizes with the clock signal CLK, and outputs the trace data related to the preceding address from the data signal terminal "DATA" per 4 bits at each time.

In the seventh cycle, when the selection signal SEL2 becomes H level again, the selector 3 selects and outputs the 40-bit output data related to the succeeding address from the CPU-access event generation circuit 2. Thereafter, when the write signal TRW2 becomes H level, the 40-bit data related to the corresponding succeeding address is write into the trace memory 4.

Next, in the tenth cycle, when output of the trace data related to the preceding address is completed, at the timing when the synchronous signal SYNC for tracing becomes H level, the trace data abbreviation circuit 5 synchronizes with the clock signal CLK, and outputs the trace data related to the succeeding address from the data signal terminal "DATA" per 4 bits at each time. On this occasion, the trace data abbreviation circuit 5 abbreviates overlapped bit strings of the succeeding address with those of the preceding address sequentially from the upper address in the succeeding address on the basis of the succeeding address abbreviation information ST2 and outputs trace data without the thus abbreviated overlapped portion. From the data signal terminal "DATA", the trace data is output in the order of the status information ST1 that indicates which type the trace event is, the succeeding address abbreviation information ST2, the address data (ALL), one part of which has been abbreviated, and read or write data related to the succeeding address (DLL, DLH, DHL, DHH). On this occasion, the fact that the upper 12-bit portion of the succeeding address coincides with that of the preceding address is detected, and the trace data with the upper 12-bit portion of the succeeding address been abbreviated is output on the basis of the succeeding address abbreviation information ST2. Hence, by employing the above circuit configuration, although 9 clock cycles for tracing have been required conventionally for outputting the trace data related to the CPU-access event, the minimum required cycle can be reduced to only 6 cycles (7 cycles in the above case).

Next, the trace data abbreviation circuit for performing abbreviation of the address data related to the succeeding address is now explained into detail as below.

Figure 8:
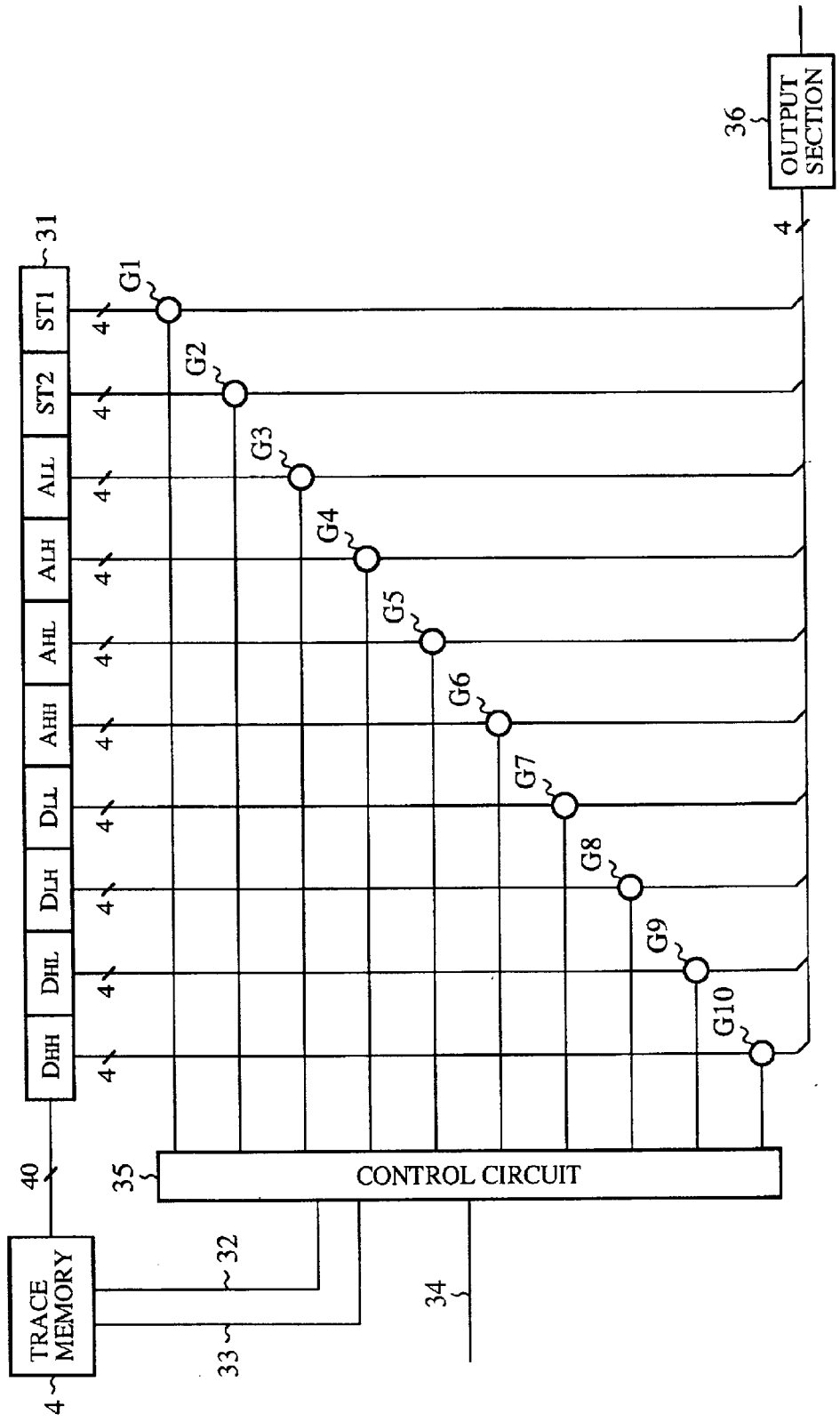
FIG. 8 is a block diagram showing the inner configuration of the trace data abbreviation circuit shown in FIG. 6.

FIG. 8 is a same trace data abbreviation circuit as the one shown in FIG. 3. The trace data abbreviation circuit employed in the first embodiment for performing abbreviation of address data related to the branch-destination address can be used even for abbreviating the address data related to the succeeding address. Comparing the abbreviation performed in this embodiment with the abbreviation of address data related to the branch-destination address according to the first embodiment, the only difference resides in that the data format related to the bit string configuring the trace data read out to the register 31 is different.

Next, the operation of the trace data abbreviation circuit is shown below.

First of all, since the selection of data abbreviation format related to the succeeding address data is performed by the same process as the flowchart shown in FIG. 4, the detailed explanation thereabout is omitted here.

When a read request signal is output by way of the signal line 33, and the trace data related to the CPU-access event is read out to the register 31, the control circuit 35 synchronizes with the clock signal CLK and performs ON-OFF control for each of the transmission gates G1 to G10 sequentially, so that the trace data can be output per 4 bits each in the order of the status information ST1, the succeeding address abbreviation information ST2, the address data (ALL, ALH, AHL, AHH), and the read or write data (DLL, DLH, DHL, DHH). On this occasion, if it is set such that the upper-4 bit portion AHH of the succeeding address data is abbreviated, the control circuit 35 holds the transmission gate G6 in the OFF state, whereas if it is set such that the upper 8-bit portion (AHH, AHL) of the succeeding address data is abbreviated, the control circuit 35 holds the transmission gates G5 and G6 in the OFF state. Further, if it is set such that the upper 12-bit portion (AHH, AHL, ALH) of the succeeding address data is abbreviated, the control circuit 35 holds the transmission gates G4, G5 and G6 in the OFF state, whereas if it is set such that the whole 16-bit data (AHH, AHL, ALH, ALL) of the succeeding address data is abbreviated, the control circuit 35 holds the transmission gates G3, G4, G5 and G6 in the OFF state.

Figure 9:
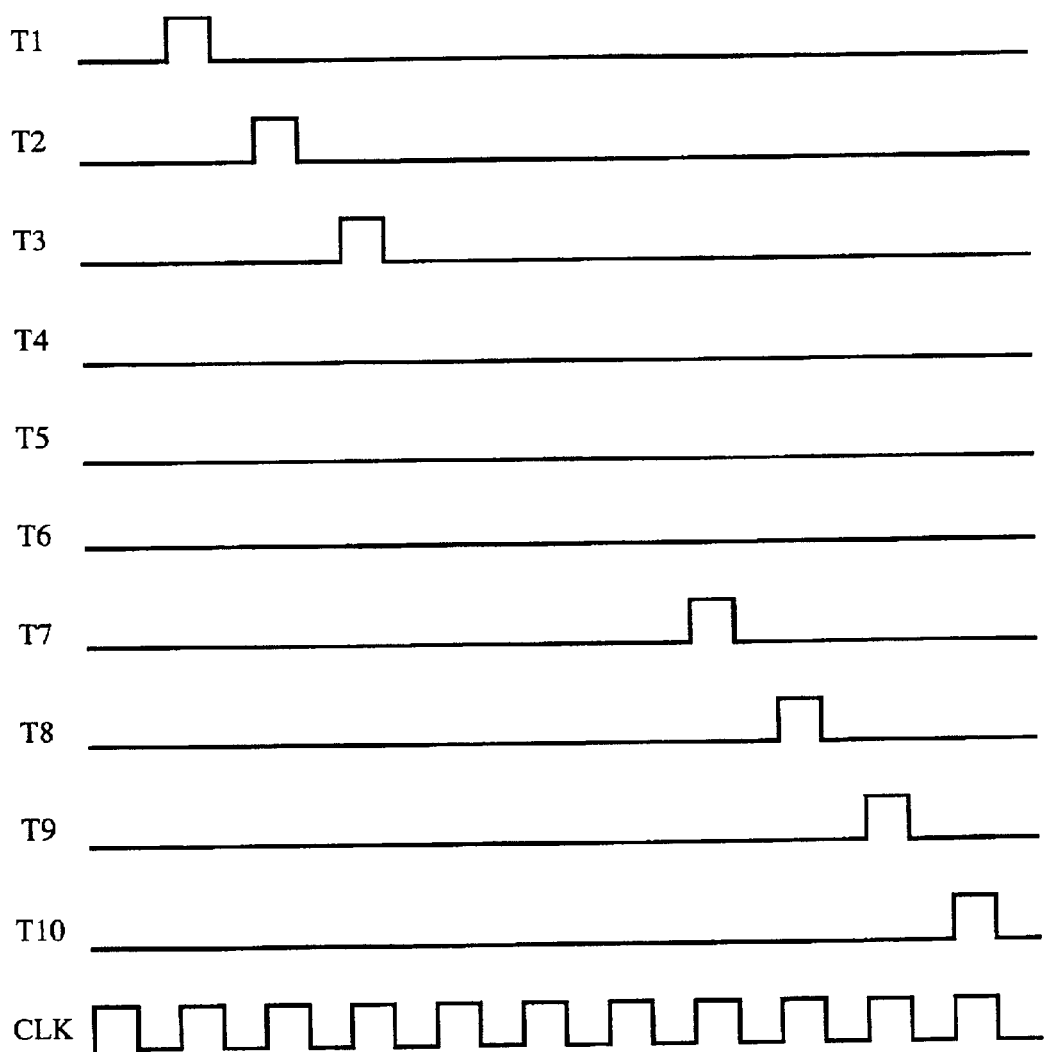
FIG. 9 is a timing chart showing an example of waveshapes of the gate signals respectively input to each of the transmission gates.

FIG. 9 is a timing chart showing the example of the waveshapes of the gate signals T1 to T10 respectively input to each of the transmission gates G1 to G10. Here, the case in which the upper 12-bit portion (AHH, AHL, ALH) of the succeeding address data is to be abbreviated is taken up as an example. As shown in FIG. 9, first the gate signals T1 to T3 and T7 to T10 are set to H level in order in synchronism with the clock signal CLK, and the transmission gates G1 to G3 and G7 to G10 are thereby set to ON sequentially, and thereafter, 7-packet trace data including the status information ST1, the succeeding address abbreviation information ST2, the address data (ALL) and the read or write data (DLL, DLH, DHL, DHH) are output in order.

As explained above, since the trace control circuit according to this second embodiment of the present invention is constructed in such a manner that it comprises a CPU access-event generation circuit 2 having an address abbreviation information generation circuit 42 for detecting a portion in which the preceding address and the succeeding address which are to be accessed sequentially are overlapped with each other and generating the succeeding address abbreviation information on the basis of the result of the detection, and a trace data abbreviation circuit 5 for performing abbreviation of some parts of the trace data on the basis of the succeeding address abbreviation information and outputting the partly abbreviated trace data, whereby the number of data packets of the trace data can be reduced to speed up the output operation of the trace data, so that the ability to output trace data in real time can be greatly increased.

Further, it is constructed such that the CPU-access event generation circuit 2 comprises latch circuits 44, 45, 46 and 47 for latching the address data per 4 bits for each, latch circuits 56, 57, 58 and 59 for latching the address data per 4 bits for each, which address data being delayed for a predetermined one base clock cycle from these latch circuits 44, 45, 46 and 47, and comparators 60, 61, 62 and 63 that compare the data held by the latch circuits 44, 45, 46 and 47 with the data held by the latch circuits 60, 61, 62 and 63 and outputs the result of the comparison to the address abbreviation information generation circuit 42, so that the 4 overlapped portion of the address data of the preceding address with that of the succeeding address can be detected per 4 bits at each time, whereby in comparison with the case in which address data are simply separated into the upper address group and the lower address group to detect the overlapped portion thereof, many more variations can be provided to the patterns for detecting the overlapped portion of the address data, and the number of omittable data packets with the trace data can be increased, whereby the output operation of the data can be made much faster.

(Third Embodiment)

In the conventional trace control circuit, when a data access instruction is executed, all the read or write data are output as trace data regardless of the value of these data as shown in FIG. 18. However, data to read or write in response to a data access instruction normally include many of binary value "0".

Considering the above fact, the trace control circuit according to the third embodiment of the present invention abbreviates, among all the read or write data regarding the trace data stored in the trace memory, all the data packets in which the value of all bits included therein are "0", that is, the packets whose bit string is "0000", per 4 bits at each time, and outputs the trace data without the thus abbreviated packets.

Figure 10:
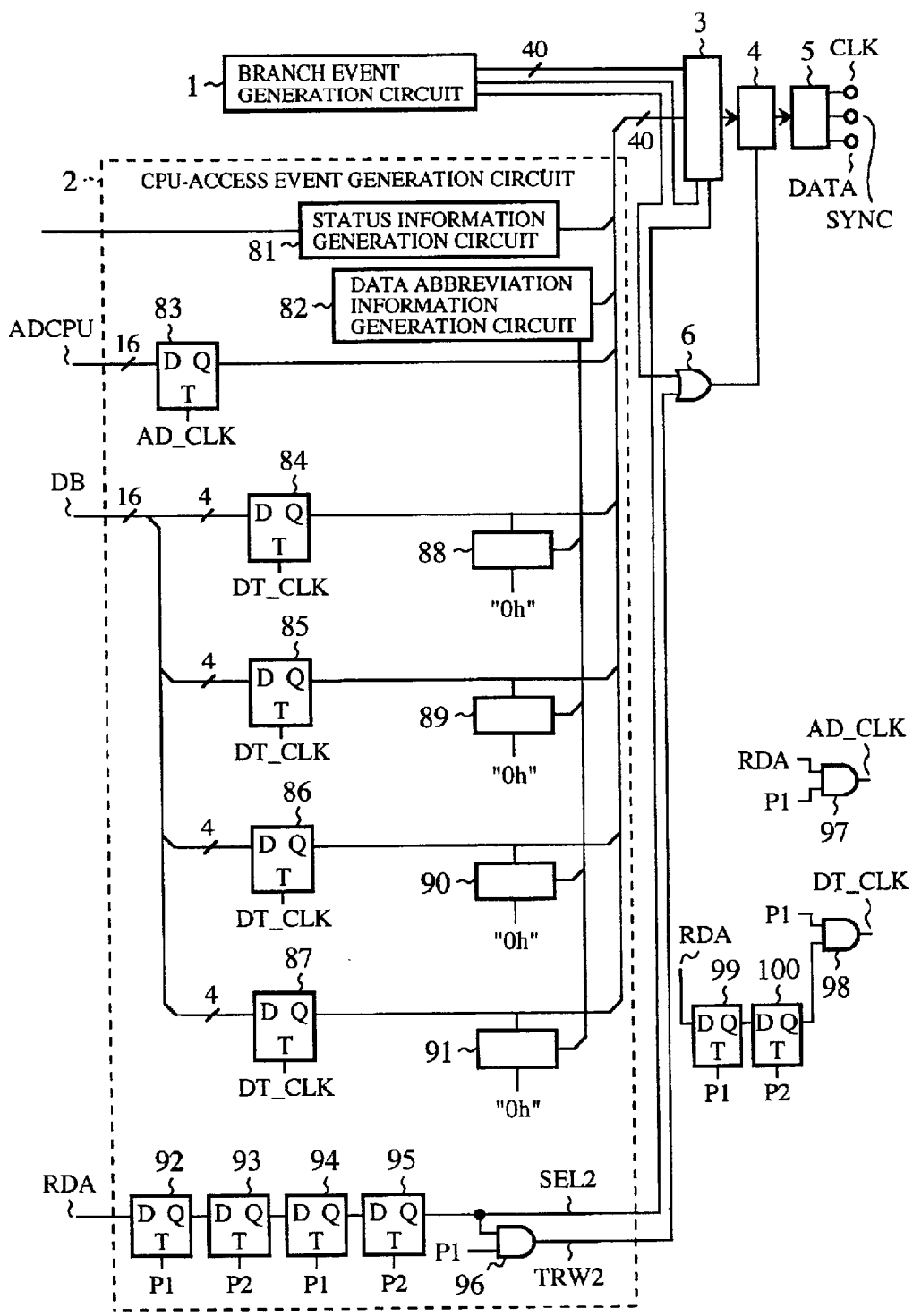
FIG. 10 is a schematic diagram showing the configuration of a trace control circuit according to a third embodiment of the present invention.

FIG. 10 is a circuit diagram showing the inner configuration of a trace control circuit according to the third embodiment of the present invention, focussing on the circuit portion related to generation of the CPU-access event. In FIG. 10, the same reference numerals as those in FIG. 1 indicate same or similar portions, so that the detailed explanation thereabout is omitted here. Numeral 81 denotes a status information generation circuit that receives a control signal from the CPU and generates 4-bit status information related to this trace event, 82 denotes an address abbreviation information generation circuit for generating 4-bit address abbreviation information (data abbreviation information generating means), 83 denotes a latch circuit that latches 16-bit data, numerals 84, 85, 86 and 87 denote read or write data latch circuits (latching means) for respectively latching 4-bit data, numerals 88, 89, 90 and 91 denote comparators (comparing means) for comparing the 4-bit data held by the latch circuits 84, 85, 86 and 87 with the data "0000" which is an abbreviation target bit string, numerals 92, 93, 94 and 95 denote latch circuits for latching 1-bit data, numerals 96, 97 and 98 denote AND gates, and numerals 99 and 100 also denote latch circuits for latching 1-bit data, respectively.

Figure 14:
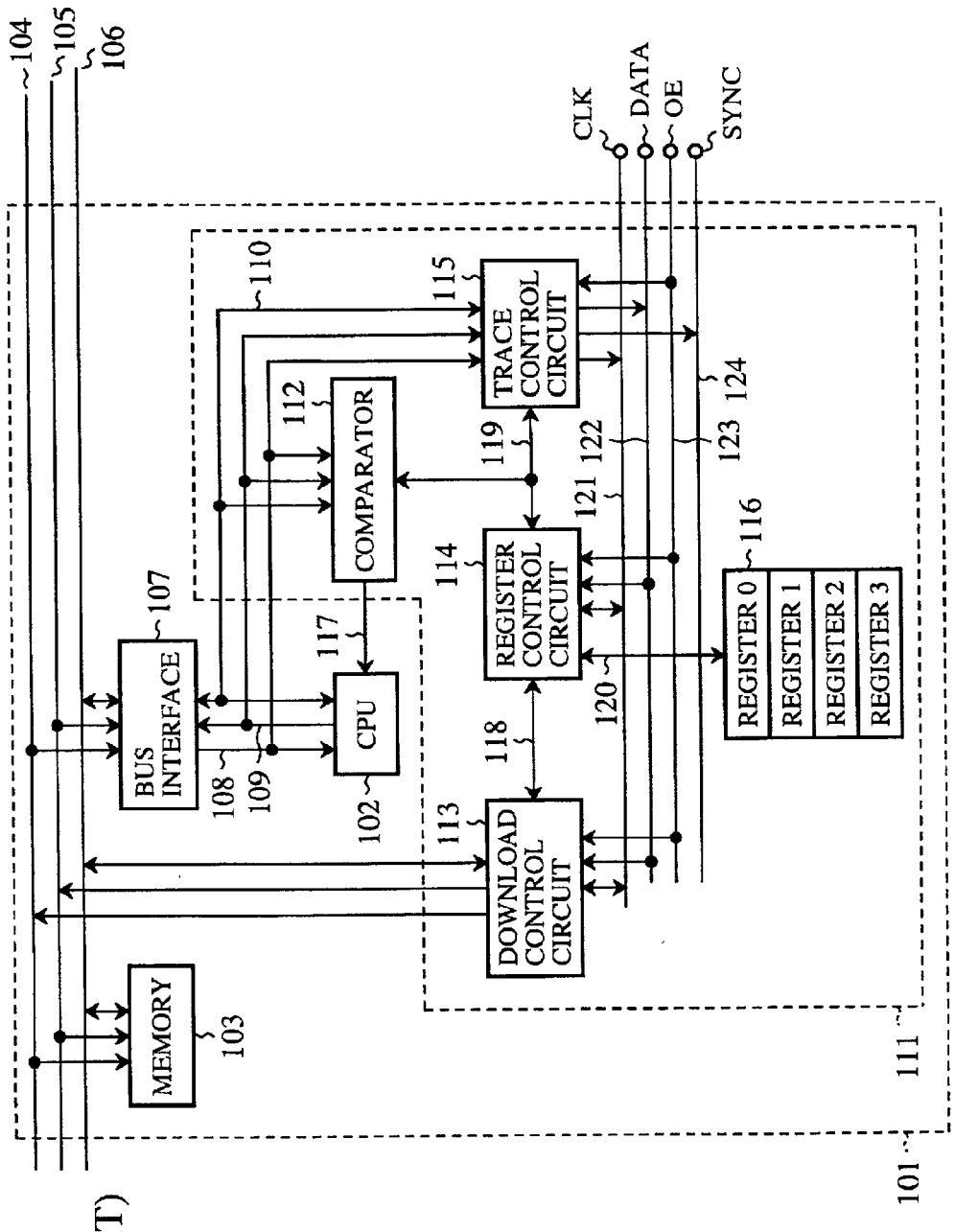
FIG. 14 is a schematic diagram showing the configuration of a microcomputer provided with a conventional debugging circuit.
Figure 15:
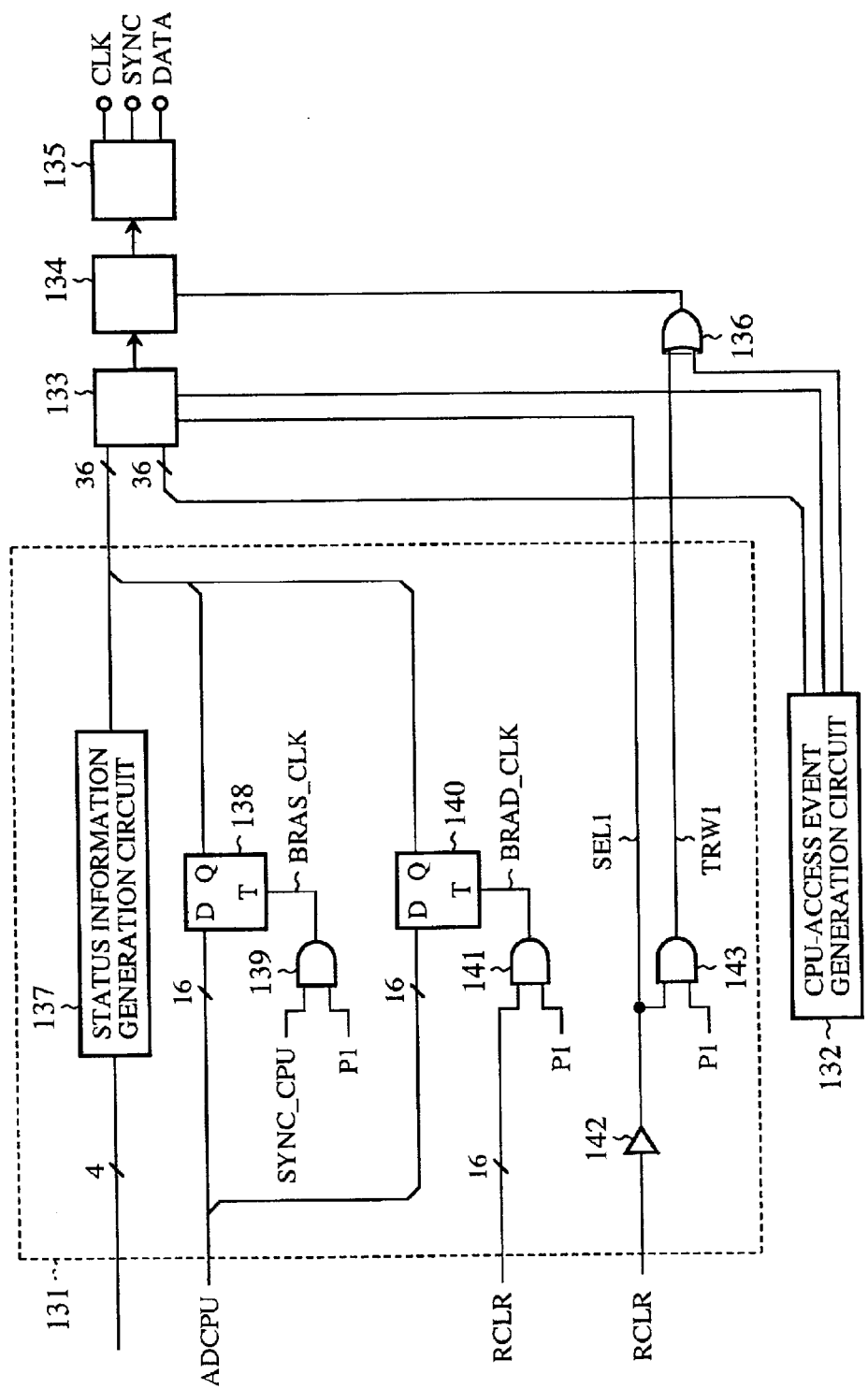
FIG. 15 is a block diagram showing the inner configuration of the trace data control circuit shown in FIG. 14.

Further, since a microcomputer equipped with the trace control circuit according to this third embodiment has same configuration as that of the conventional microcomputer shown in FIG. 14, the detailed explanation about its entire operation is omitted here. It is also to be noted that the abbreviation target bit string is not limited to the data "0000", but can be any arbitrary bit string.

Next, the operation of the trace control circuit as constructed above is now explained as below.

Figure 11:
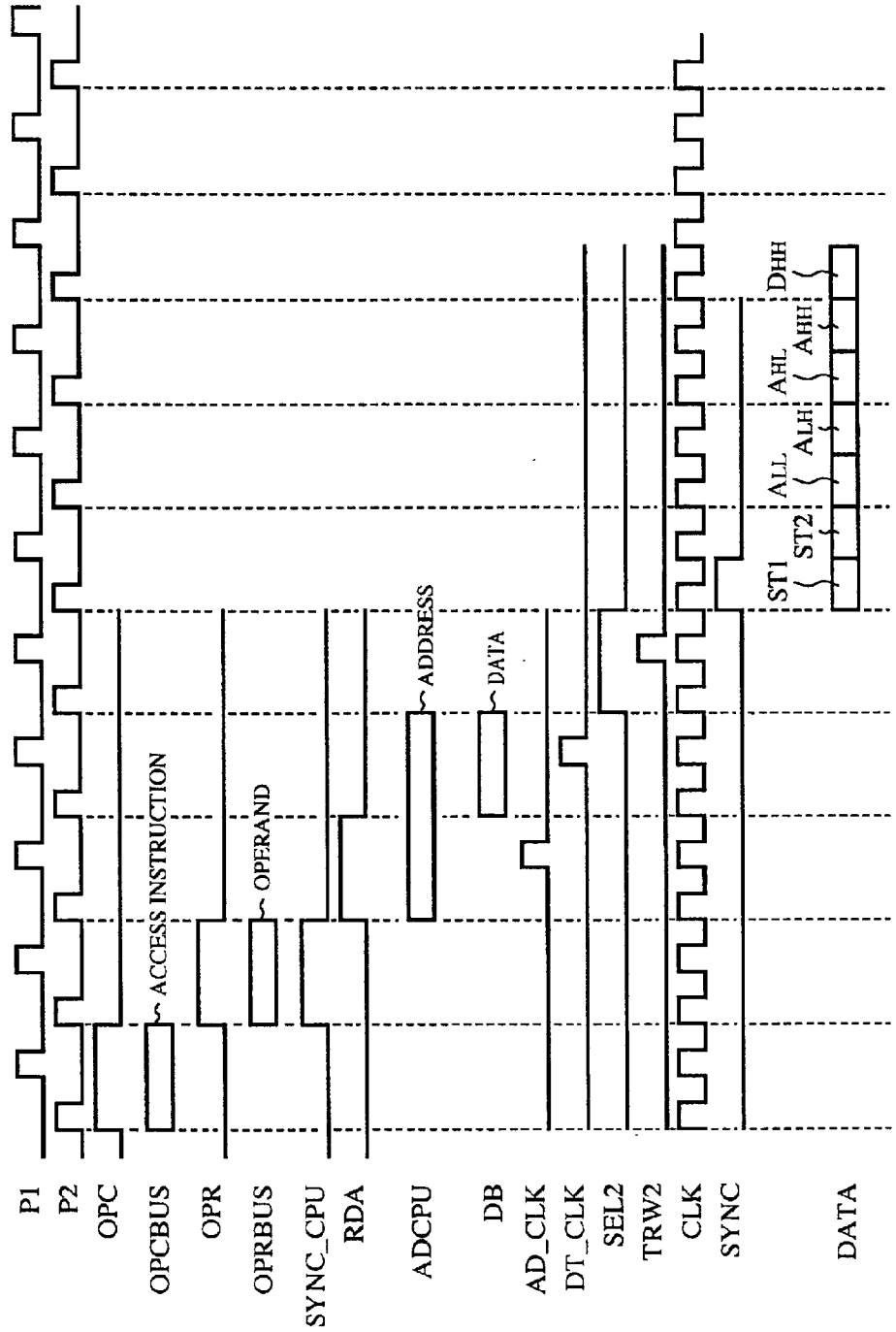
FIG. 11 is a timing chart showing waveshapes of various signals related to the trace control circuit of the third embodiment.

FIG. 11 is a timing chart showing waveshapes of various signals related to the trace control circuit of the third embodiment of the present invention. In FIG. 11, the same reference numerals as those in FIG. 7 indicate same or similar portions, so that the detailed explanation thereabout is omitted here.

At the branch data access instruction execution time, first the status information generation circuit 81 inputs a control signal from the CPU, and generates 4-bit status information ST1 which is information showing the type of the present trace event or the like. This status information is decoded by an external debugger disposed outside the microcomputer, and an appropriate processing is performed in accordance with the thus decoded information. Thereafter, when the address latch signal AD_CLK, which is provided as an ANDed value of the data access request signal RDA and the base clock signal P1 output from the AND gate 97, becomes H level, the address data output to the address bus ADCPU of the CPU is latched by the latch circuit 83. Thereafter, when the data latch signal DT_CLK, which is provided as an ANDed value of the data access request signal RDA delayed for one base clock cycle by the latch circuits 99 and 100 and the base clock signal P1 output due to the operation of the AND gate 98, becomes H level, read or write data output to the data bus DB is latched respectively by the latch circuits 84, 85, 86 and 87 per 4 bits each. Thereafter, the comparators 88, 89, 90 and 91 respectively compare the bit string held by the latch circuits 84, 85, 86 and 87 with the abbreviation target bit string "0000", and outputs the result of the comparison to the data abbreviation information generation circuit 82. This data abbreviation information generation circuit 82 generates data abbreviation information ST2 on the basis of the comparison.

Next, when the selection signal SEL2 delayed by the latch circuits 92, 93, 94 and 95 for two base clock cycles with respect to the data access request signal RDA becomes H level, the selector 3 receives 40-bit data in total; namely 4-bit status information ST1 indicating the type of the trace event output from the status information generation circuit 81, 4-bit data abbreviation information ST2 output from the data abbreviation information generation circuit 82, 16-bit address data output from the latch circuit 83, and 16-bit read or write data output per 4 bits respectively from latch circuits 84, 85, 86 and 87, and selects signals to be output therefrom. Thereafter, when the write signal TRW2 provided as an ANDed signal of the selection signal SEL2 and the base clock signal P1 from the AND gate 96 becomes H level, 40-bit data composed of the status information, the data abbreviation information, the address data and the read or write data is write into the trace memory 4.

Thereafter, when the synchronous signal SYNC for tracing becomes H level, the trace data abbreviation circuit 5 reads out the data from the trace memory 4 in synchronism with the clock signal CLK, and sequentially outputs the thus read trace data from the data signal terminal "DATA" by 4 bits per each time. On this occasion, in accordance with the data abbreviation information ST2, the trace data abbreviation circuit 5 abbreviates the bit strings that coincide with a bit string "0000" within the bit strings of 4-bit sectioned read or write data, and outputs the trace data without the thus abbreviated bit strings. Various data are output from the data signal terminal "DATA" in the order of the status information ST1 that indicates the type of the trace event, the data abbreviation information ST2, the address data (ALL, ALH, AHL, AHH), and the partly abbreviated read or write data DHH. For this reason, by employing the above circuit configuration, although 9 clock signal cycles for tracing have been required conventionally for outputting the trace data related to the branch event, the minimum required cycle can be reduced to only 6 cycles (7 cycles in the above case).

Next, the trace data abbreviation circuit for performing the abbreviation of read or write data is explained into detail as below. Note that since the inner configuration of the trace data abbreviation circuit is same as the one shown in FIG. 8, the detailed explanation thereabout is omitted here.

Figure 12:
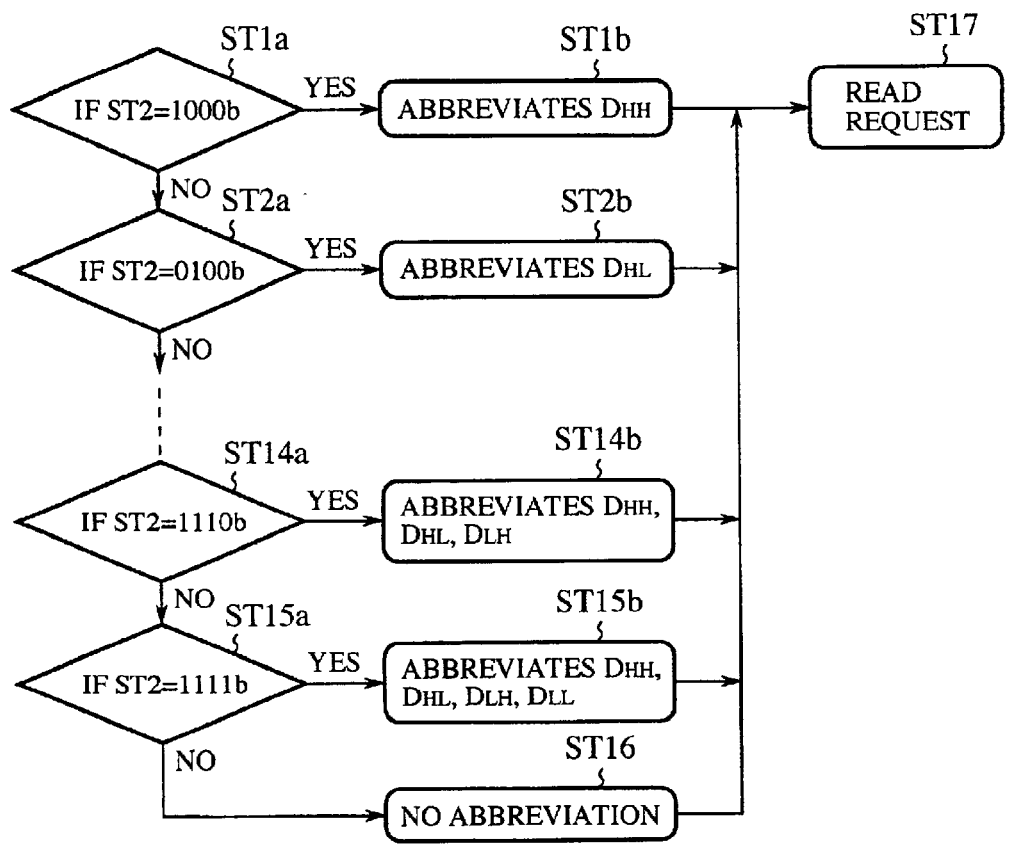
FIG. 12 is a flowchart showing the abbreviation process of the trace data performs on the basis of the data abbreviation information.

FIG. 12 is a flowchart showing the abbreviation process of the trace data on the basis of the data abbreviation information ST2. For performing generation of the data abbreviation information ST2, detection bits b1, b2, b3 and b4 configuring the 4-bit data abbreviation information ST2 ("b1, b2, b3, b4") are assigned to each of the bit strings DHH, DHL, DLH, DLL configuring the 4-bit sectioned read or write data (DHH, DHL, DLH, DLL), and indicates whether or not these bit strings DHH, DHL, DLH, DLL coincide with "0000" which is an abbreviation target bit string. That is, if the detection bit b1 assigned to the uppermost bit string DHH is "0", it indicates that the bit string DHH does not coincide with "0000", whereas if the detection bit b1 is "1", then it indicates that the bit string DHH coincides with "0000".

Since there are 15 types of data abbreviation formats concerning the 4-bit sectioned read or write data (DHH, DHL, DLH, DLL), for setting the data abbreviation formats in accordance with the data abbreviation information ST2, it is determined one by one as to whether or not the data abbreviation information ST2 coincides with either one of the 15 types of data abbreviation formats as shown in FIG. 12. For example, it is checked whether the data abbreviation information ST2 coincides with "1000" in step ST1a, and in this case, if it is determined that the information ST2 coincides, then it is set such that the upper 4-bit string DHH of the read or write data is abbreviated in step ST1b, whereas if not, then it is checked whether the data abbreviation information ST2 coincides with "0100" in step ST2a. Here, if it is determined that the information ST2 coincides with "0100", then it is set such that 4-bit string DHL next to the above upper 4-bitstring DHH of the read or write data is abbreviated in step ST12.

In this way, the bit string matching check related to the abbreviation format is continued until the data abbreviation format that matches is found out, and in the latter determination steps, it is checked whether the data abbreviation information ST2 coincides with "1110" in step ST14a. and in this case, if it is determined that the data abbreviation information ST2 coincides, then it is set such that the upper 12-bit portion (DHH, DHL, DLH) of the read or write data is abbreviated in step ST14b. whereas if not, then it is checked whether the data abbreviation information ST2 coincides with "1111" in step ST15a. and if it is determined that it coincides, then it is set such that the whole 16-bit portion (DHH, DHL, DLH, DLL) of the read or write data is abbreviated in step ST15b. whereas if not, then it is set such that no data abbreviation is executed with respect to the read or write data.

Thereafter, when the abbreviation format is determined about the read or write data in either one of the steps ST1b to ST15b and also ST16, the control circuit 35 sends a read request signal for reading out the trace data in the trace memory 4 to the register 31 in step ST17.

Figure 13:
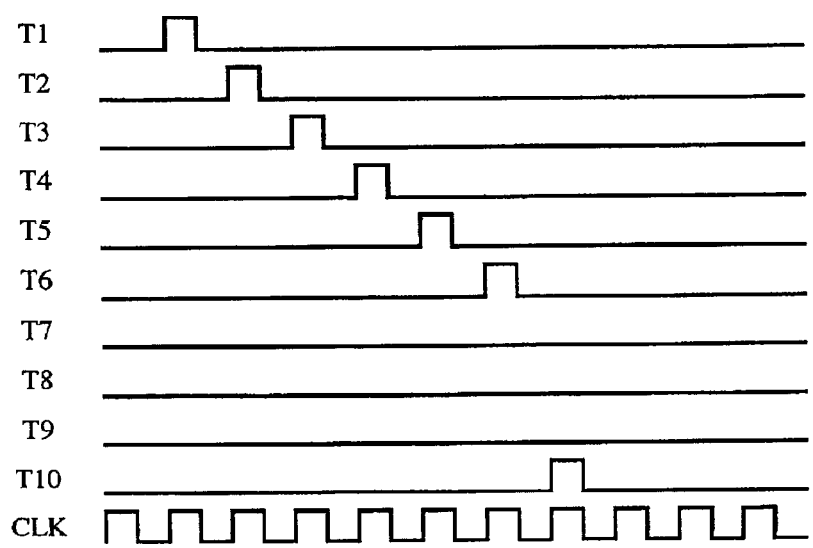
FIG. 13 is a timing chart showing an example of waveshapes of the gate signals respectively input to each of the transmission gates.

When the trace data is readout into the register 31, the control circuit 35 performs an ON-OFF control of each of the transmission gates G1 to G10 in synchronism with the clock signal CLK, so that the trace data is output per 4 bits for each time in the order of the status information ST1, the data abbreviation information ST2, the address data (ALL, ALH, AHL and AHH) and the read or write data (DLL, DLH, DHL and DHH). On this occasion, if the upper 4-bit string (DHH) of the read or write data is to be abbreviated, the control circuit 35 holds the transmission gate G10 in the OFF state, and if the second upper 4-bit string DHL of the read or write data is to be abbreviated, the control circuit 35 holds the transmission gate G9 in the OFF state, and if the third upper 4-bit string DLH of the read or write data is to be abbreviated, the control circuit 35 holds the transmission gate G8 in the OFF state, and finally if the last 4-bit string ADLL of the read or write data is to be abbreviated, the control circuit 35 holds the transmission gate G7 in the OFF state. FIG. 13 is a timing chart showing an example of waveshapes of the gate signals T1 to T10 respectively input to each of the transmission gates G1 to G10. Here, the case in which the bit strings of the lower 12 bits (DLL, DLH, DHL) of the read or write data are to be abbreviated is explained as an example. As shown in FIG. 13, first the gates signals T1 to T6 and T10 are set to H level in order in synchronism with the clock signal CLK for tracing, and the transmission gates G1 to G6 and G10 are thereby set to ON, and thereafter 7-packet trace data including the status information ST1, the data abbreviation information ST2, the address data (ALL, ALH. AHL, AHH) and read or write data DHH is output.

As explained above, since the trace control circuit according to this third embodiment of the present invention is constructed in such a manner that it comprises a CPU access-event generation circuit 2 which is equipped with latch circuits 84, 85, 86 and 87 for latching read or write data per 4 bits each, comparators 88, 89, 90 and 91 that compare the bit string held by the latch circuits 84, 85, 86 and 87 with "0000" set as a bit abbreviation target bit string, and a data abbreviation information generation circuit 82 that inputs the result of the comparison output from the comparators 88, 89, 90 and 91, and also comprises a trace data abbreviation circuit 5 that performs abbreviation of some portion of data about the trace data on the basis of the data abbreviation information and outputs the partly abbreviated trace data, whereby the read or write data within the trace data is sectioned into the bit strings of 4 bits each, and bit strings that coincide with an abbreviation target bit string "0000" among each of the thus sectioned bit strings can be abbreviated, so that the number of data packets of the trace data to be output can be reduced to speed up the output operation of trace data, and the ability to output trace data in real time can be greatly improved thereby.

Further, since the trace data abbreviation circuit 5 comprises a register 31 capable of reading out the trace data related to the CPU-access event from the trace memory 4 and storing the thus read out data therein, the transmission gates G1 to G10 disposed in a 4-bit sectioned manner between the register 31 and the output section 36, and the control circuit 35 that is connected to each of the transmission gates G1 to G10 and performs ON-OFF control of the transmission gates G1 to G10 by outputting gate signals T1 to T10, if the control circuit 35 controls the timing for setting to the active mode the gate signals input to the transmission gate corresponding to each of the bit strings to be traced out, it can be readily executed that the bit strings related to the read or write data disposed in an arbitrary position within the trace data can be abbreviated, and the bit strings other than the thus abbreviated bit string can be sequentially output as the trace data.

It should be noted that a circuit portion for detecting an overlapped portion related to the succeeding address data in the trace control circuit according to the second embodiment can be used in a combined manner with a circuit portion for detecting an overlapped portion related to the read or write data in the trace control circuit according to the third embodiment, and by adopting such a circuit configuration, even more trace data related to the CPU access-event can be abbreviated.

Further, although the trace control circuit according to each of the first to third embodiments performs abbreviation of trace data by use of the trace data abbreviation circuit 5 disposed in the rear side of the trace memory 4, even if the abbreviation of trace data is executed before the data is stored in the trace memory 4, the same effects can be expected.

As explained heretofore, according to the present invention, the trace control circuit comprises a branch event generation circuit having an address abbreviation information generation circuit for detecting an overlapped portion of the branch-source address with that of the branch-destination address sequentially from the upper address bit sides thereof and generating branch-destination address abbreviation information on the basis of the result of the detection, and a trace data abbreviation means for performing abbreviation of same part of the trace data on the basis of the branch-destination address abbreviation information and outputting the partly abbreviated trace data, whereby the number of data packets of the trace data can be reduced to speed up the output operation of the trace data, so that the ability to output trace data in real time can be greatly improved.

According to the present invention, the trace control circuit is constructed in such a manner that the branch-event generation circuit further comprises one or more than one first latching means for latching address data per predetermined number of bits for each, one or more than one second latching means for delaying the address data for predetermined base clock cycles from the first latching means and latching per predetermined number of bits for each, and one or more than one comparing means for comparing the data latched by the first latching means and the data latched by the second latching means per predetermined number of bits for each of the comparing means and outputting the result of the comparison to the address abbreviation information generation means.

Due to this construction, the overlapped portion of the address data of the branch-source address with that of the branch-destination address can be detected per 4 bits at each time, whereby in comparison with the case in which address data is simply sectioned into the upper address group and the lower address group to detect the overlapped portion thereof, more variations can be proved to the patterns for detecting the overlapped portion of the address data, and the number of omittable data packets within the trace data can be increased, so that the output operation of the data can be made much faster.

According to the present invention, the trace control circuit comprises a CPU access-event generation circuit having an address abbreviation information generation circuit for detecting a portion in which the preceding address and the succeeding address which are to be accessed sequentially are overlapped with each other and generating the succeeding address abbreviation information on the basis of the result of the detection, and a trace data abbreviation circuit for performing abbreviation of some parts of the trace data on the basis of the succeeding address abbreviation information and outputting the partly abbreviated trace data, whereby the number of data packets of the trace data can be reduced to speed up the output of the trace data, so that the ability to output trace data in real time can be greatly increased.

According to the present invention, the trace control circuit is constructed such that the CPU-access event generation circuit further comprises one or more than one first latching means for latching address data per predetermined number of bits for each, one or more than one second latching means for delaying the address data for predetermined base clock cycles from the first latching means and latching per predetermined number of bits for each, and one or more than one comparing means for comparing the data latched by the first latching means and the data latched by the second latching means per predetermined number of bits and outputting the result of the comparison to the address abbreviation information generation means.

Due to this construction, the overlapped portion of the address data of the preceding address with that of the succeeding address can be detected per 4 bits at each time, whereby in comparison with the case in which address data is simply separated into the upper address group and the lower address group to detect the overlapped portion thereof, many more patterns can be provided to the patterns for detecting the overlapped portion of the address data, and the number of omittable data packets within the trace data can be increased, so that the output operation of the data can be made much faster.

According to the present invention, the trace control circuit is constructed such that the trace data abbreviation means further comprises a register capable of reading and storing trace data related to one trace event from the trace data abbreviation means, a plurality of switching means disposed between each of the storing means composing the register and an output section of the trace data abbreviation means, and a control means that is connected to a control terminal of each of the plurality of switching means and executes an on-off control per predetermined number of bits as a base unit for data abbreviation, on the basis of the address abbreviation information.

Due to this construction, if the control means controls the timing for setting the gate signals input to the transmission gates corresponding to each of the 4-bit strings to be traced out to the active mode, it can be readily executed that the 4-bit string related to the address data disposed in an arbitrary position within the trace data is abbreviated, and the bit strings other than the thus abbreviated bit strings can be sequentially output as the trace data.

According to the present invention, the trace control circuit comprises a CPU-access event generation circuit having one or more than one latching means for latching read or write data per predetermined number of bits for each of the latching means, one or more than one comparing means for comparing the data latched by the one or more than one latching means per predetermined number of bits for each with a predetermined abbreviation target bit string, ad a data abbreviation information generation means that inputs the result of the comparison output from the one or more than one comparing means and generating abbreviation information per predetermined number of bits for each related to the read or write data, and also comprises a trace data abbreviation means that abbreviates some parts of the trace data and outputs the thus partly abbreviated trace data.

Due to this construction, the read or write data within the trace data is sectioned into bit strings composed arbitrary number of bits for each, and bit strings that coincide with a predetermined abbreviation target bit string among each of the thus sectioned bit strings can be abbreviated, so that the number of data packets of the trace data to be output can be reduced to speed up the output operation of trace data, and the ability to output trace data in real time can be greatly improved thereby.

According to the present invention, the trace control circuit is constructed such that the trace data abbreviation means further comprises a register capable of reading and storing trace data related to one trace event from the trace data abbreviation means, a plurality of switching means disposed between each of the storing means composing the register and an output section of the trace data abbreviation means, and a control means that is connected to a control terminal of each of the plurality of switching means and executes an on-off control per predetermined number of bits as a base unit for data abbreviation, on the basis of the address abbreviation information.

Due to this construction, if the control means controls the timing for setting the gate signals input to the transmission gates corresponding to each of the 4-bit strings to be traced out to the active mode, it can be readily executed that the 4-bit string related to the read or write data disposed in an arbitrary position within the trace data is abbreviated, and the bit strings other than the thus abbreviated bit strings can be sequentially output as the trace data.

What is claimed is:

1. A trace data control circuit comprising:
    a branch event generation circuit for outputting trace data related to a branch instruction in response to a branch instruction,
    a CPU-access event generation circuit for outputting a trace data related to a data access instruction in response to a data access instruction,
    a selection means capable of inputting at least trace data output from the branch-event generation circuit and trace data output from the CPU-access event generation circuit, and selecting trace data related to either one of these events,
    a memory means for storing the trace data, and
    a trace data abbreviation means that abbreviates one part of the trace data and outputs the trace data excluding the abbreviated part of the trace data,
    wherein said branch event generation circuit further comprises an address abbreviation information generation means for detecting an overlapped portion of a branch-source address with a branch-destination address from the upper address bit sides thereof, and generating a branch-destination address abbreviation information.

2. The trace control circuit according to claim 1, wherein said branch-event generation circuit further comprises:
    one or more than one first latching means for latching address data per predetermined number of bits respectively,
    one or more than one second latching means for respectively delaying address data for predetermined base clock cycles from the first latching means and latching the delayed data per predetermined number of bits for each, and
    one or more than one comparing means each for comparing the data latched by the first latching means with the data latched by the second latching means per predetermined number of bits and outputting the result of the comparison to the address abbreviation information generation means.

3. The trace control circuit according to claim 2, wherein said trace data abbreviation means further comprises:
    a register capable of reading out and storing a trace data related to one of trace events including said branch access event from the trace data abbreviation means,
    a plurality of switching means disposed between a plurality of storing means composing said register and an output section of said trace data abbreviation means, and
    a control means which is connected to a control terminal of each of the plurality of switching means and executes an on-off control per predetermined number of bits as a base unit for data abbreviation on the basis of the address abbreviation information.

4. A trace data control circuit comprising:
    a branch event generation circuit for outputting trace data related to a branch instruction in response to a branch instruction,
    a CPU-access event generation circuit for outputting a trace data related to a data access instruction in response to a data access instruction,
    a selection means capable of inputting at least trace data output from the branch-event generation circuit and trace data output from the CPU-access event generation circuit, and selecting trace data related to either one of these events,
    a memory means for storing the trace data, and
    a trace data abbreviation means that abbreviates one part of the trace data and outputs the trace data without the abbreviated part of the trace data,
    wherein the CPU-access event generation circuit further comprises an address abbreviation information generation means for detecting an overlapped portion of a preceding address to be accessed with a succeeding address to be accessed next from the upper address bit sides thereof, in the case of consecutive data access operation, and generating succeeding address abbreviation information.

5. The trace control circuit according to claim 4, wherein said CPU-access event generation circuit further comprises;
    one or more than one first latching means for latching address data per predetermined number of bits for each,
    one or more than one second latching means for delaying address data for predetermined base clock cycles from the first latching means and latching per predetermined number of bits for each, and
    one or more than one comparing means each for comparing the data latched by the first latching means with the data latched by the second latching means per predetermined number of bits and outputting the result of the comparison to the address abbreviation information generation means.

6. The trace control circuit according to claim 5, wherein said trace data abbreviation means further comprises:
    a register capable of reading out and storing a trace data related to one of trace events including said CPU-access event from the trace data abbreviation means,
    a plurality of switching means disposed between a plurality of storing means composing said register and an output section of said trace data abbreviation means, and
    a control means which is connected to a control terminal of each of the plurality of switching means and executes an on-off control per predetermined number of bits as a base unit for data abbreviation on the basis of the address abbreviation information.

7. A trace data control circuit comprising:
    a branch event generation circuit for outputting trace data related to a branch instruction in response to a branch instruction,
    a CPU-access event generation circuit for outputting a trace data related to a data access instruction in response to a data access instruction,
    a selection means capable of inputting at least trace data output from the branch-event generation circuit and trace data output from the CPU-access event generation circuit, and selecting trace data related to either one of these events, a memory means for storing the trace data, and a trace data abbreviation means that abbreviates one part of the trace data and outputs the trace data without the abbreviated part of the trace data, wherein said CPU-access event generation circuit further comprises one or more than one latching means for latching read or write data per predetermined number of bits respectively, one or more than one comparing means each for comparing bit strings held by said one or more than one latching means per predetermined number of bits with a predetermined abbreviation target bit string, and a data abbreviation information generation circuit that inputs the result of the comparison output from said one or more than one comparing means and generates abbreviation information per predetermined number of bits of data related to the read or write data.

8. The trace control circuit according to claim 7, wherein said trace data abbreviation means further comprises:

a register capable of reading and storing a trace data related to either one of said branch event or said CPU-access event from said memory means, a plurality of switching means disposed between a plurality of storing means composing the register and an output section of said trace data abbreviation means, and a control means that is connected to a control terminal of each of the plurality of switching means and executes an on-off control per a predetermined number of bits as a base unit for data abbreviation, on the basis of the address abbreviation information.

* * * * *